United States Patent
Kato et al.

(10) Patent No.: US 8,039,057 B2
(45) Date of Patent: Oct. 18, 2011

(54) POLYIMIDE FILM, IMAGE-FORMING APPARATUS, METHOD FOR PRODUCING THE POLYIMIDE FILM, AND METHOD FOR PRODUCING THE INTERMEDIATE TRANSFER BELT

(75) Inventors: Seiichi Kato, Minamiashigara (JP); Shoichi Morita, Minamiashigara (JP); Masao Ohkubo, Ebina (JP); Yoko Miyamoto, Ebina (JP); Akira Tateishi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 564 days.

(21) Appl. No.: 12/155,439

(22) Filed: Jun. 4, 2008

(65) Prior Publication Data

US 2008/0280226 A1 Nov. 13, 2008

Related U.S. Application Data

(62) Division of application No. 10/953,970, filed on Sep. 30, 2004, now abandoned.

(30) Foreign Application Priority Data

Mar. 24, 2004 (JP) ................................ 2004-087306

(51) Int. Cl.
*B32B 27/34* (2006.01)
*C08G 73/10* (2006.01)

(52) U.S. Cl. ................... 427/372.2; 428/473.5; 525/422; 399/308; 524/606; 156/138

(58) Field of Classification Search ............... 427/372.2; 428/473.5; 525/422; 399/308; 524/606; 156/138
See application file for complete search history.

(56) References Cited

U.S. PATENT DOCUMENTS

| | | | |
|---|---|---|---|
| 5,109,070 A | 4/1992 | Epstein et al. | |
| 2003/0099027 A1 | 5/2003 | Shigehiro et al. | |

FOREIGN PATENT DOCUMENTS

| | | |
|---|---|---|
| JP | A-62-206567 | 9/1987 |
| JP | A-63-311263 | 12/1988 |
| JP | A-05-077252 | 3/1993 |
| JP | A-05-200904 | 8/1993 |
| JP | A-06-095521 | 4/1994 |
| JP | A-06-149079 | 5/1994 |
| JP | A-06-149081 | 5/1994 |
| JP | A-06-149083 | 5/1994 |
| JP | A-06-228335 | 8/1994 |
| JP | A-9-176329 | 7/1997 |
| JP | A-10-063115 | 3/1998 |
| JP | A-2001-109277 | 4/2001 |

*Primary Examiner* — James J Seidleck
*Assistant Examiner* — Saira B Haider
(74) *Attorney, Agent, or Firm* — Oliff & Berridge, PLC

(57) ABSTRACT

A polyimide film having a polyimide as the primary constituent and containing at least a polymeric electroconductive material, wherein
in a weight-decrease vs. temperature-increase curve when the polyimide film is heated gradually from 30° C., a weight-decrease rate at a first inflection point, where an amount of difference in weight-decrease rates decreases first from 30° C., is in the range of −1.9% or more and −1.4% or less.

9 Claims, 10 Drawing Sheets ated Mar. 24, 2004. The disclosures of
POLYIMIDE FILM, IMAGE-FORMING APPARATUS, METHOD FOR PRODUCING THE POLYIMIDE FILM, AND METHOD FOR PRODUCING THE INTERMEDIATE TRANSFER BELT This is a Division of application Ser. No. 10/953,970 filed Sep. 30, 2004, which claims the benefit of Japanese Application No. 2004-087306 filed Mar. 24, 2004. The disclosures of the prior applications are hereby incorporated by reference herein in their entirety.

BACKGROUND OF THE INVENTION

1. Field of the Invention

The invention relates to a polyimide film having a polyimide as the primary constituent and containing at least a polymeric electroconductive material, an image-forming apparatus having an intermediate transfer belt made of the polyimide film, a method for producing the polyimide film, and a method for producing the intermediate transfer belt.

2. Description of the Related Art

Some image-forming apparatuses by electrophotographic process employ an endless intermediate transfer belt (see, e.g., Japanese Patent Application Laid-Open (JP-A) No. 62-206567). In the image-forming apparatuses equipped with an intermediate transfer belt, an image is formed by forming an electrostatic latent image on the surface of an image carrier, developing the electrostatic latent image with a toner into a toner image, transferring the toner image on the image carrier once onto the intermediate transfer belt electrostatically (primary transfer) by applying a bias voltage to the intermediate transfer belt circulating while in contact with the image carrier, finally retransferring the toner image on the intermediate transfer belt onto a recording paper and fixing the image thereon into a fixed toner image (secondary transfer).

The intermediate transfer belt is an endless element prepared by cutting a film-shaped base material into a long belt and connecting both ends of the belt to each other. Materials for use as the intermediate transfer belts hitherto proposed include conductive belts made of thermoplastic resin including a polycarbonate resin (see JP-A No. 6-95521); polyvinylidene fluoride (PVDF) (see JP-A Nos. 5-200904 and 6-228335); polyalkylene phthalate (see JP-A No. 6-149081), and blends of polycarbonate (PC)/polyalkylene terephthalate (PAT) (see JP-A No. 6-149083), ethylene tetrafluoroethylene copolymer (ETFE)/PC, ETFE/PAT, and PC/PAT (see JP-A No. 6-149079); and the like.

However, a conductive material made of a thermoplastic resin such as a polycarbonate resin, polyvinylidene fluoride (PVDF) or the like is inferior in mechanical properties, leading to larger deformation of the belt by the stress during operation and consequently to less reliable formation of high-quality transferred images. In addition, it also has a shortened belt life, due to cracks generated at the belt edges during operation.

Alternatively, intermediate transfer belts made of a thermosetting polyimide resin, which is superior in mechanical properties and heat resistance, and conductive filler dispersed therein is proposed (see JP-A Nos. 5-77252 and 10-63115). An intermediate transfer belt made of a carbon black-dispersed thermosetting polyimide was also proposed (see JP-A No. 63-311263).

However, such intermediate transfer belts carry a problem that the intermediate transfer belts made of a thermosetting polyimide resin containing a conductive filler or carbon black as the conductive material exhibit decrease in volume or surface resistivity by repeated application of bias voltages during the primary transfer, and thus could not provide high-quality transfer images reliably. They also carry a disadvantage that if a conductive filler or carbon black is dispersed in the polyimide resin, the resulting belt becomes brittle and more vulnerable to cracks.

As a new measure to overcome these disadvantages, an intermediate transfer belt having a polyimide as the primary constituent and containing at least polyaniline and a dopant for making the polyaniline conductive was proposed (see JP-A No. 2001-109277).

SUMMARY OF THE INVENTION

However, although the intermediate transfer belt described in Patent Reference 11 containing a dopant for making the polyaniline conductive has extremely consistent volume and surface resistivity during repeated application of bias voltages compared to the intermediate transfer belts described in Patent References 8 to 10 containing a conductive filler or carbon black dispersed therein if the polyaniline is made sufficiently conductive until it reaches a stabilized region, but if the conductivity of the belt is insufficient, the volume resistivity and surface resistivity gradually deteriorate over time regardless of whether the bias voltages are applied repeatedly or not. Another disadvantage is that it requires an extended period of time to make polyaniline sufficiently conductive. Yet another disadvantage is that the belt becomes shrunk and deformed by the heat applied when the cut belt is thermally compressed at both ends in production of the intermediate transfer belt, resulting in deterioration in dimensional accuracy and thus could not provide high-quality transfer images reliably.

The present invention has been made in view of the above circumstances and provides a polyimide film containing a polymeric electroconductive material sufficiently higher in conductivity and thus having a stabilized resistivity, an image-forming apparatus having an intermediate transfer belt made of the polyimide film, a method for producing the polyimide film in a period as short as possible, and a method for producing the intermediate transfer belt that provides high-quality transfer images.

The polyimide film according to the invention is a polyimide film having a polymeric electroconductive material as the primary constituent and containing at least a polymeric electroconductive material, wherein in a weight-decrease vs. temperature-increase curve when the polyimide film is heated gradually from 30° C., a weight-decrease rate at an intersection between a tangent line which passes a first maximum point in the curve having the maximum value in the slope and a tangent line which passes a minimum point in the curve having the minimum value in the slope after the first point, is in the range of −1.9% or more and −1.4% or less.

Final polyimide films are normally produced after baked in an oven or the like. The polyimide films immediately after discharge from an oven do not contain water and absorb water over time as the polyimide films are inherently hygroscopic. On the contrary, polyimide films containing water also release water when placed in a low-temperature and low-humidity environment. Polyimide films stored in normal environment (e.g. temperature: 22° C., and humidity: 55% RH) for a long period have stabilized water content, but release water and lose weight when heated gradually.

In particular, in the case of polyimide films containing polyaniline as the polymeric electroconductive material, the polyaniline therein is made more conductive by oxidation. Although polyaniline, a hygroscopic compound, demands presence of some amount of water for oxidation, if water is present in an excess amount, it becomes lower in resistivity due to the ionic conduction caused by the residual ion components from the polyaniline and dopant.

Considering the normal environment where the polyimide films are used (temperature: approximately 22° C., and humidity: around 55% RH), the allowable range of the weight-decrease rate thereof during a period from 30° C. to the first inflection point in the weight decrease vs. temperature curve when the polyimide film is heated gradually from 30° C. is specified here in the invention. If the weight-decrease rate is less than −1.9% or more than −1.4%, the water content of polyimide films varies and the resistivity of polyimide films becomes unstable in normal environment where polyimide films are used. In other words, the water content of the polyimide film according to the invention and consequently the resistivity thereof become more stabilized in normal environment.

The image-forming apparatus according to the invention is an image-forming apparatus that forms an image by forming a toner image on an image carrier and transferring and fixing the toner image finally on a recording medium, including an intermediate transfer belt in contact with the image carrier whereon the toner image is formed for receiving the toner image from the image carrier once by application of a bias voltage and transferring the toner image onto a recording medium, wherein, the intermediate transfer belt is made of a polyimide film having a polyimide as the primary constituent and containing at least a polymeric electroconductive material, and in a weight-decrease vs. temperature-increase curve when the intermediate transfer belt is heated gradually from 30° C., a weight-decrease rate at an intersection between a tangent line which passes a first maximum point in the curve having the maximum value in the slope and a tangent line which passes a minimum point in the curve having the minimum value in the slope after the first point, is in the range of −1.9% or more and −1.4% or less.

In the image-forming apparatus according to the invention, the surface resistivity and volume resistivity of the intermediate transfer belt are stable even after repeated application of bias voltages and thus allow reliable production of high-quality transfer images.

The intermediate transfer belt may have a surface resistivity of $10^{10}\Omega/\square$ or more and $10^{14}\Omega/\square$ or less and a volume resistivity of $10^{8}$ $\Omega \cdot cm$ or more and $10^{14}$ $\Omega \cdot cm$ or less, and the intermediate transfer belt may contain filler particles having a particle diameter of 0.1 μm or more additionally added.

The former polyimide film provides high-quality transfer images, while the latter suppresses fluctuation in the length of intermediate transfer belt and provides the intermediate transfer belt with sufficiently high mechanical strength, assuring more stabilized movement of the belt. Each resistivity above is the value as determined when a voltage of 100V is applied.

The method for producing a polyimide film according to the invention includes the steps of forming a polyimide compound having a polyimide as the primary constituent and containing at least a polymeric conductive agent into a film shape; and exposing to high temperature and humidity the film-shaped polyimide compound formed in the step of forming the polyimide compound wherein the polyimide compound is kept in an environment of a temperature of 27° C. or more and a humidity of 70% RH or more.

By the method for producing a polyimide film according to the invention, the water content of the polyimide film is stabilized in a shorter period of time by the processing in the step of high temperature and humidity exposure, allowing more efficient production of the polyimide film according to the invention.

The method for producing an intermediate transfer belt according to the invention is a method for producing an endless intermediate transfer belt in contact with an image carrier whereon a toner image is formed for receiving the toner image once from the image carrier by application of a bias voltage and retransferring the toner image onto a recording medium, for use in an image-forming apparatus wherein an image is formed by forming a toner image on an image carrier and retransferring and fixing the toner image finally on a recording medium, including the steps of:

exposing a film-shaped polyimide compound to high temperature and humidity at a temperature of 27° C. or more and a humidity of 70% RH or more, the film-shaped polyimide compound having a polyimide as the primary constituent, containing at least a polymeric electroconductive material and having a differential thermal characteristic in which a differential thermal curve is created, the differential thermal curve at a temperature of 150° C. or more having a plurality of inflection points corresponding to an intersection between a tangent line passing a point of a change from increase to decrease in the slope of the curve and a tangent line passing a point of a change from decrease to increase in the slope of the curve;

cutting into a long belt the film-shaped polyimide compound after the step of exposure to high temperature and humidity;

and heat-compressing the resultant belt by connecting both ends of the belt cut off in the step of cutting into a long belt with an adhesive and heating and compressing both connected end regions at a temperature in the range of 150° C. or more to the inflection point closest to 150° C. where the slope of the differential thermal curve becomes smaller.

By the method for producing an intermediate transfer belt according to the invention, the resistivity of the intermediate transfer belt becomes stabilized in a shorter period of time by the processing in the step of high temperature and humidity exposure, and additionally an intermediate transfer belt superior in dimensional accuracy can be obtained by the processing in the step of thermocompression. That is, if a wet belt is subjected to thermocompression, water in the belt is released, causing shrinkage of the belt in the width direction and waveness on the surface thereof. If the temperature of thermocompression is in the range of 150° C. or more to the inflection point closest to 150° C. where the slope of the differential thermo curve becomes smaller, the heat-compressed belt which is suppressed in the shrinkage in the width direction and surface waveness, returns almost to the original shape by absorbing water in the environment when allowed to cool, allowing the shrunk portion to return to the original shape, and thus can regain its favorable dimensional accuracy, but when the temperature of thermocompression is higher than the temperature above, the belt becomes completely or almost absolutely dry, leaving the shrunk area and the worsened dimensional accuracy as they are.

The invention provides a polyimide film overcoming the disadvantages described above, i.e., a polyimide film having a polymeric electroconductive material sufficiently higher in conductivity and thus more stabilized in resistivity, an image-forming apparatus having an intermediate transfer belt made of the polyimide film, a method for producing the polyimide film in a period as short as possible, and a method for producing the intermediate transfer belt that provides high-quality transfer images.

BRIEF DESCRIPTION OF THE DRAWINGS

Preferred embodiments of the present invention will be described in detail based on the following figures wherein.

DETAILED DESCRIPTION OF THE INVENTION

Hereinafter, embodiments of the invention will be described with reference to drawings.

Figure 1:
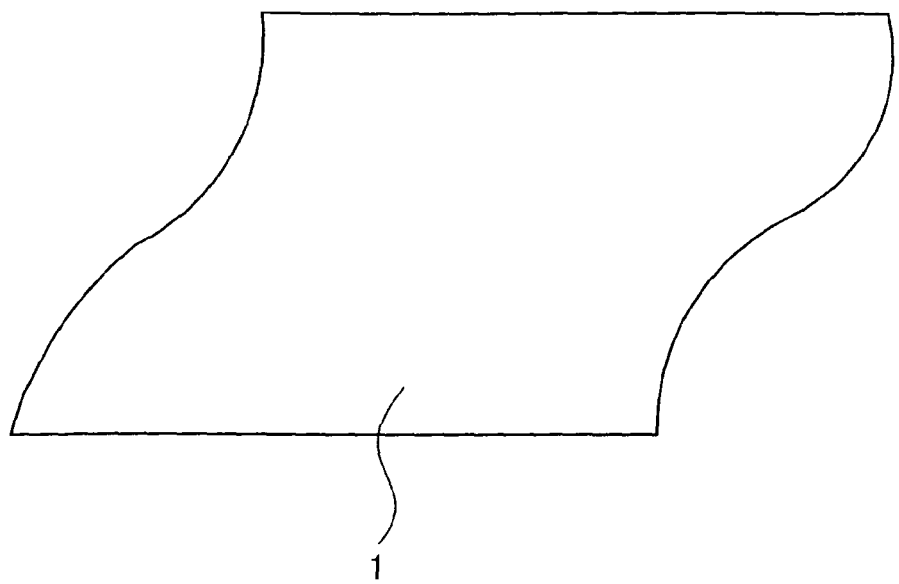
FIG. 1 is a view illustrating an embodiment of a polyimide film according to the invention, a semiconductive polyimide film.

FIG. 1 is a view illustrating a semiconductive polyimide film, an embodiment of a polyimide film according to the invention.

The semiconductive polyimide film shown in FIG. 1 has polyimide as the primary constituent and contains polyaniline as a polymeric electroconductive material and a dopant for making the polyaniline conductive.

Results of the thermogravimetric analysis of the semiconductive polyimide film shown in FIG. 1 will be described below.

Figure 2:
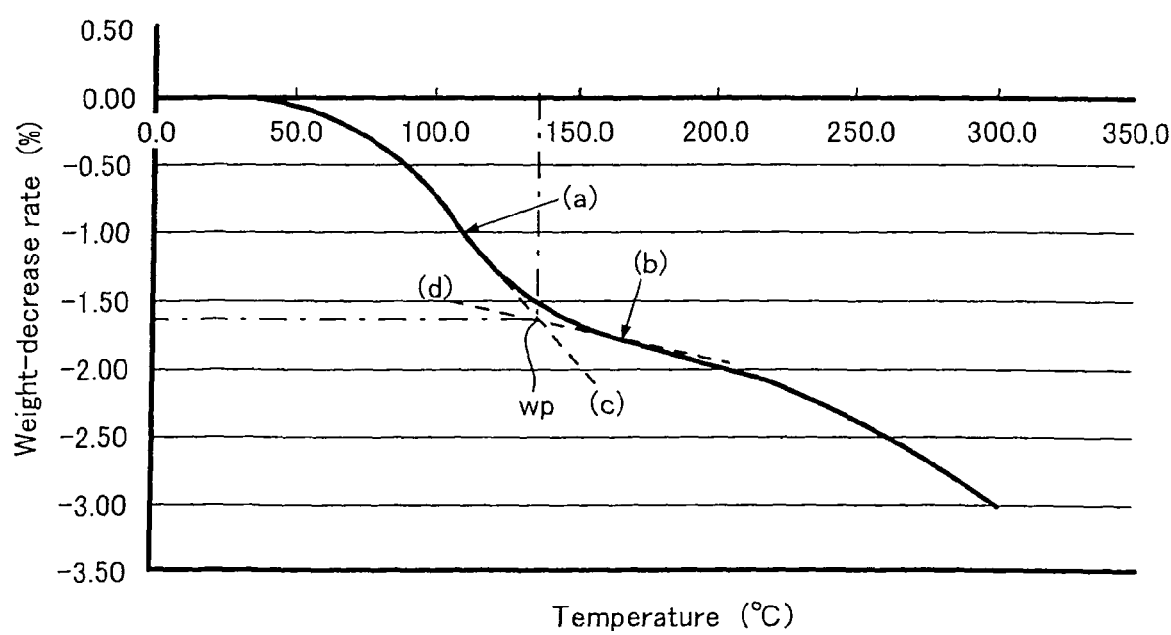
FIG. 2 is a graph showing results of thermogravimetric analysis of the semiconductive polyimide film shown in FIG. 1.

FIG. 2 is a graph showing the results of thermogravimetric analysis of the semiconductive polyimide film shown in FIG. 1.

A simultaneous differential thermal and thermogravimetric analyzer DTG-50 manufactured by Shimadzu Corporation was used for the thermogravimetric analysis. In measurement, the sample was heated from room temperature at a heating rate of 10° C./min, kept at 30° C. for 20 minutes, and then heated up to 300° C. The analysis was performed in air without use of nitrogen gas. The temperature and the weight-decrease rate data were obtained at an interval of 1 second.

The temperatures and the weight-decrease rates (%) are plotted respectively on an abscissa axis and on an ordinate axis in the graph shown in FIG. 2. In the graph of FIG. 2, shown is a thermal weight-decreasing curve wherein an inflection point wp corresponding to the intersection between a tangent line (c) at the first point (a) in the curve having the maximum value in the slope of curve and a tangent line (d) at the second point (b) in the curve having the minimum value in the slope of curve is indicated. The inflection point wp is the first inflection point where the amount of change in the weight-decrease rates decreases when determined from a temperature of 30° C., and the temperature of the inflection point wp is approximately 140° C. The weight-decrease rate at a temperature (approximately 140° C.) of this inflection point wp is approximately −1.65%. If a semiconductive polyimide film has a weight-decrease rate at the first inflection point, where the amount of change in the weight-decrease rates decreases from 30° C., in the range of −1.9% or more and −1.4% or less, the water content of the film is stable in normal environment where this film is used (temperature: approximately 22° C.; and humidity: approximately 55% RH), and accordingly the resistivity of polyimide film is stabilized.

Next, the process for producing the semiconductive polyimide film shown in FIG. 1 will be described.

Figure 3:
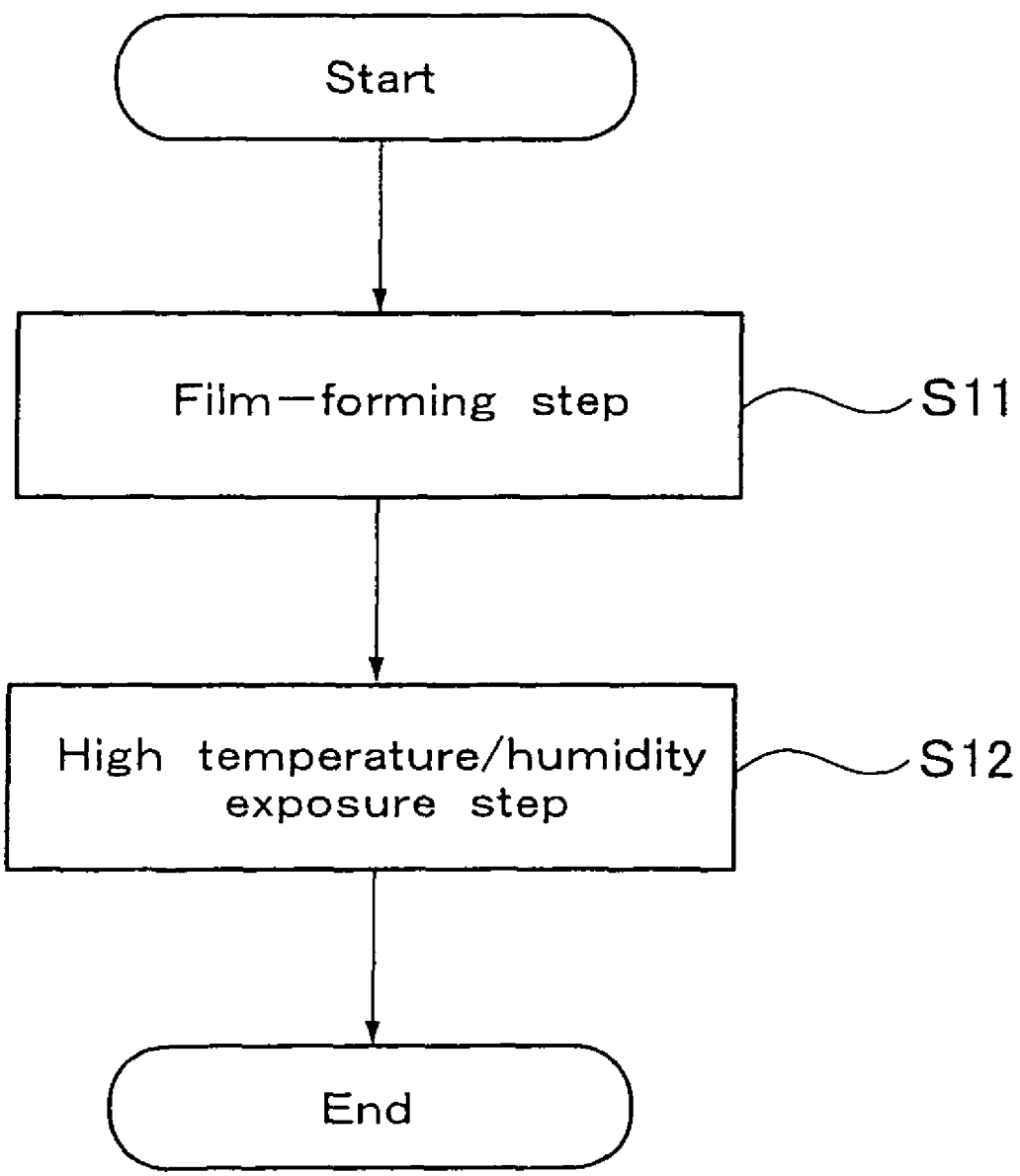
FIG. 3 is a flow chart illustrating a process for producing the semiconductive polyimide film shown in FIG. 1.

FIG. 3 is a flow chart illustrating the process for producing the semiconductive polyimide film shown in FIG. 1.

For production of the semiconductive polyimide film shown in FIG. 1, a film-shaped polyimide compound is first prepared in film-forming step (Step S11). In the film-forming step, the film-shaped polyimide compound may be produced, for example, by forming a long film by extruding a coating solution containing a polyamic acid, polyaniline, dopant and solvent via a T die, for example, onto a favorably exfoliated base material which is also favorable as a model (e.g., stainless-steel endless belt) and then imidizing the resulting film according to a known method into a film-shaped polyimide compound, or by coating the coating solution onto the internal surface of a cylindrical metal mold according to a known method while rotating the metal mold for leveling the film thickness and drying partially and then completely.

The coating solution contains polyamic acid as the primary raw material, polyaniline as the polymeric electroconductive material, and a dopant for making the polyaniline electrically conductive.

As described in JP-A No. 2001-109277, the polyamic acid can be obtained as a solution, by dissolving a near-equimolar mixture of a tetracarboxylic dianhydride or a derivative thereof and a diamine in a polar organic solvent and allowing these compounds to react in the solution. The tetracarboxylic dianhydride may be an aromatic tetracarboxylic dianhydride, while the diamine is an aromatic diamine, but the other compounds may be selected suitably as needed.

Examples of the aromatic tetracarboxylic dianhydrides include pyromellitic dianhydride, 3,3',4,4'-benzophenonetetracarboxylic dianhydride, 3,3',4,4'-biphenyltetracarboxylic dianhydride, 2,3,3',4'-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl)propane dianhydride, bis(3,4-dicarboxyphenyl)sulfone dianhydride, and the like. These dianhydrides may be used alone or in combination of two or more.

Examples of the aromatic diamines include 4,4-diaminodiphenylether, 4,4'-diaminodiphenylmethane, 3,3'-diaminodiphenylmethane, p-phenylenediamine, m-phenylenediamine, benzidine, 3,3'-dimethoxybenzidine, 4,4'-diaminodiphenylsulfone, 4,4-diaminodiphenylsulfide, 4,4'-diaminodiphenylpropane, 2,2-bis[4-(4-aminophenoxy)phenyl]propane, and the like. These diamines too may be used alone on in combination of two or more.

It is acceptable to use a polyaniline having the quinonediimine structural unit or the phenylenediamine structural unit represented by the following General Formula (I) as the primary recurring unit, where m and n represent respectively the molar fractions of the quinonediimine and phenylenediamine structural units in its recurring unit, and $0<m<1$; $0<n<1$; and $m+n=1$.
[Formula 1]
General Formula (1)

Normally, it is acceptable to use a protonic acid as the dopant. Preferable protonic acids favorable for used as the dopant have an acid dissociation constant pKa of 4.8 or less. Examples of such protonic acids include inorganic acids such as hydrochloric acid, sulfuric acid, nitric acid, phosphoric acid, borofluoric acid, phosphofluoric acid, and perchloric acid; and organic acids having an acid dissociation constant pKa of 4.8 or less.

The organic acid is, for example, an organic carboxylic acid or phenol acceptably having an acid dissociation constant pKa of 4.8 or less. Examples of the organic acids include monovalent or polyvalent aliphatic, aromatic, aromatic aliphatic, alicyclic, and the other acids. These organic acids may have a hydroxyl, halogen, nitro, cyano, amino, or other group. Typical examples of these organic acids include acetic acid, n-butyric acid, pentadecafluorooctanoic acid, pentafluoroacetic acid, trifluoroacetic acid, trichloroacetic acid, dichloroacetic acid, monofluoroacetic acid, monobromoacetic acid, monochloroacetic acid, cyanoacetic acid, acetylacetic acid, nitroacetic acid, triphenylacetic acid, formic acid, oxalic acid, benzoic acid, m-bromobenzoic acid, p-chlorobenzoic acid, m-chlorobenzoic acid, p-chlorobenzoic acid, o-nitrobenzoic acid, 2,4-dinitrobenzoic acid, 3,5-dinitrobenzoic acid, picric acid, o-chlorobenzoic acid, p-nitrobenzoic acid, m-nitrobenzoic acid, trimethylbenzoic acid, p-cyanobenzoic acid, m-cyanobenzoic acid, thymol blue, salicyclic acid, 5-aminosalicyclic acid, o-methoxybenzoic acid, 1,6-dinitro-4-chlorophenol, 2,6-dinitrophenol, 2,4-dinitrophenol, p-hydroxybenzoic acid, bromophenol blue, mandelic acid, phthalic acid, isophthalic acid, maleic acid, fumaric acid, malonic acid, tartaric acid, citric acid, lactic acid, succinic acid, $\alpha$-alanine, $\beta$-alanine, glycine, glycol acid, thioglycol acid, ethylenediamine-N,N'-diacetic acid, ethylenediamine-N,N,N',N'-tetraacetic acid, and the like.

In addition, the organic acid may have a sulfonic or sulfuric acid group. Examples of the organic acids include aminonaphtholsulfonic acid, metanilic acid, sulfanilic acid, allylsulfonic acid, laurylsulfuric acid, xylenesulfonic acid, chlorobenzenesulfonic acid, methanesulfonic acid, ethanesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, benzenesulfonic acid, styrenesulfonic acid, p-toluenesulfonic acid, naphthalenesulfonic acid, ethylbenzenesulfonic acid, propylbenzenesulfonic acid, butylbenzenesulfonic acid, pentylbenzenesulfonic acid, hexylbenzenesulfonic acid, heptylbenzenesulfonic acid, octylbenzenesulfonic acid, nonylbenzenesulfonic acid, decylbenzenesulfonic acid, undecylbenzenesulfonic acid, dodecylbenzenesulfonic acid, pentadecylbenzenesulfonic acid, octadecylbenzenesulfonic acid, diethylbenzenesulfonic acid, dipropylbenzenesulfonic acid, dibutylbenzenesulfonic acid, methylnaphthalenesulfonic acid, ethylnaphthalenesulfonic acid, propylnaphthalenesulfonic acid, butylnaphthalenesulfonic acid, pentylnaphthalenesulfonic acid, hexylnaphthalenesulfonic acid, heptylnaphthalenesulfonic acid, octylnaphthalenesulfonic acid, nonylnaphthalenesulfonic acid, decylnaphthalenesulfonic acid, undecylnaphthalenesulfonic acid, dodecylnaphthalenesulfonic acid, pentadecylnaphthalenesulfonic acid, octadecylnaphthalenesulfonic acid, dimethylnaphthalenesulfonic acid, diethylnaphthalenesulfonic acid, dipropylnaphthalenesulfonic acid, dibutylnaphthalenesulfonic acid, dipentylnaphthalenesulfonic acid, dihexylnaphthalenesulfonic acid, diheptylnaphthalenesulfonic acid, dioctylnaphthalenesulfonic acid, dinonylnaphthalenesulfonic acid, trimethylnaphthalenesulfonic acid, triethylnaphthalenesulfonic acid, tripropylnaphthalenesulfonic acid, tributylnaphthalenesulfonic acid, camphorsulfonic acid, acrylamide-t-butylsulfonic acid, and the like.

Alternatively, the organic acid may be a multifunctional organic sulfonic acid having two or more sulfate groups in the molecule. Examples of the multifunctional organic sulfonic acids include ethanedisulfonic acid, propanedisulfonic acid, butanedisulfonic acid, pentanedisulfonic acid, hexanedisulfonic acid, heptanedisulfonic acid, octanedisulfonic acid, nonanedisulfonic acid, decanedisulfonic acid, benzenedisulfonic acid, naphthalenedisulfonic acid, toluenedisulfonic acid, ethylbenzenedisulfonic acid, propylbenzenedisulfonic acid, butylbenzenedisulfonic acid, dimethylbenzenedisulfonic acid, diethylbenzenedisulfonic acid, dipropylbenzenedisulfonic acid, dibutylbenzenedisulfonic acid, methylnaphthalenedisulfonic acid, ethylnaphthalenedisulfonic acid, propylnaphthalenedisulfonic acid, butylnaphthalenedisulfonic acid, pentylnaphthalenedisulfonic acid, hexylnaphthalenedisulfonic acid, heptylnaphthalenedisulfonic acid, octylnaphthalenedisulfonic acid, nonylnaphthalenedisulfonic acid, dimethylnaphthalenedisulfonic acid, diethylnaphthalenedisulfonic acid, dipropylnaphthalenedisulfonic acid, dibutylnaphthalenedisulfonic acid, naphthalenetrisulfonic acid, naphthalenetetrasulfonic acid, anthracenedisulfonic acid, anthraquinonedisulfonic acid, phenanthrenedisulfonic acid, fluorenonedisulfonic acid, carbazoledisulfonic acid, diphenylmethanedisulfonic acid, biphenyldisulfonic acid, terphenyldisulfonic acid, terphenyltrisulfonic acid, naphthalenesulfonic acid-formaline condensate, phenanthrenesulfonic acid-formaline condensate, anthracenesulfonic acid-formaline condensate, fluorenesulfonic acid-formaline condensate, carbazolesulfonic acid-formaline condensate, and the like. These sulfate groups may be present at any positions of the aromatic rings above.

Yet alternatively, the organic acid may be a polymer acid. Examples of the polymer acids include polyvinylsulfonic acid, polyvinylsulfuric acid, polystyrenesulfonic acid, sulfonated styrene-butadiene copolymer, polyallylsulfonic acid, polymethallylsulfonic acid, poly-2-acrylamide-2-methyl propanesulfonic acid, poly-halogenated acrylic acid, polyisoprene sulfonic acid, N-sufoalkylated polyanilines, ring-sulfonated polyanilines, and the like. Fluorine-containing polymers known as Nafion (trademark registered by du Pont, U.S.) may also be used favorably as the polymer acid.

In addition, among the esters from the organic acid and the polyhydroxy compound described above, organic esters having an acid terminal are also acceptable. Examples of these polyhydroxy compounds include polyvalent alcohols such as ethylene glycol, propylene glycol, 1,3-propanediol, 1,4-butanediol, 1,3-butanediol, 1,5-pentanediol, neopentylglycol, 1,6-hexanediol, 1,4-bis(hydroxyethyl)cyclohexane, bisphenol A, hydrogenated bisphenol A, hydroxypivalyl hydroxypivalate, trimethylol ethane, trimethylol propane, 2,2,4-trimethyl-1,3-pentanediol, glycerin, hexanetriol, tris(2-hydroxyethyl)isocyanurate and pentaerythritol; polyether glycols such as polyoxyethylene glycol, polyoxypropylene glycol, polyoxyethylene tetramethylene glycol, polyoxypropylene tetramethylene glycol, polyoxyethylene polyoxypropylene polyoxytetramethylene glycol; modified polyether polyols prepared by ring-opening polymerization of the polyvalent alcohols with ethylene oxide, propylene oxide, tetrahydrofuran, ethyl glycidyl ether, propyl glycidyl ether, butyl glycidyl ether, phenyl glycidyl ether or allyl glycidyl ether or the like; and the like.

Solvents for the acids are, for example, dimethylacetamide (DMAc) and N-methylpyrrolidone (NMP).

The film prepared in the film-forming step, i.e., Step S11 shown in FIG. 3, is then subjected to a high temperature and humidity exposure step (Step S12). In the high temperature humidity exposure step, the film-shaped polyimide compound prepared in the film-forming step is kept in an environment of a temperature of 45° C. and a humidity of 85% RH for 20 hours. The polyimide compound absorbs water in the high temperature and humidity exposure step. The polyimide compound becomes more oxidized by absorbing water and the polyaniline becomes more conductive. It requires a period of 20 hours to make the polyimide compound uniformly conductive in the step, but the period is significantly shortened compared to the period of at least a half year required under normal temperature and humidity condition (temperature: approximately 22° C.; and humidity: approximately 55% RH) to make polyaniline sufficiently conductive.

The semiconductive polyimide film shown in FIG. 1 is prepared in the two steps described above.

Next, an image-forming apparatus equipped with an element made of the semiconductive polyimide film shown in FIG. 1 will be described.

Figure 4:
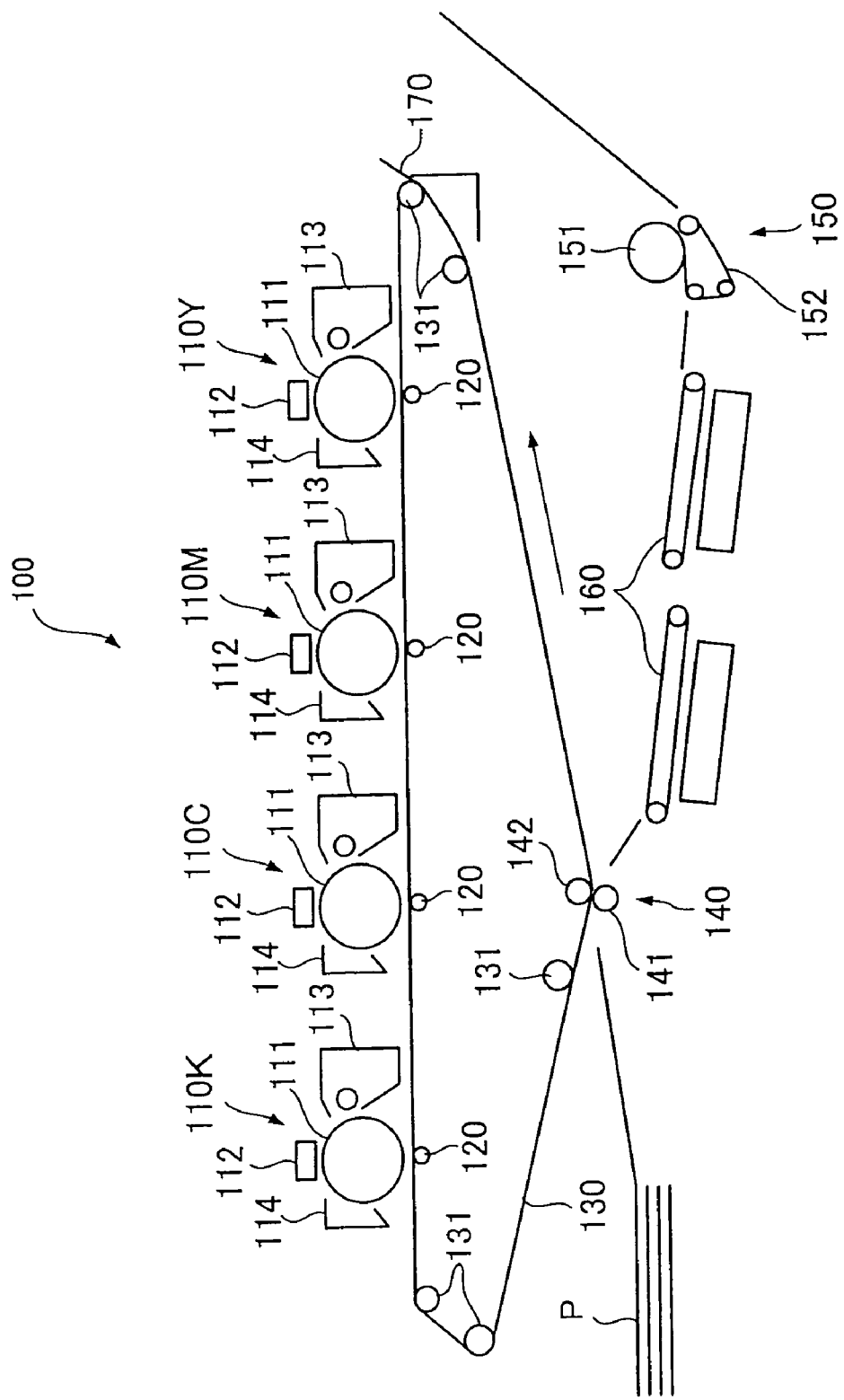
FIG. 4 is a schematic view illustrating an embodiment of an image-forming apparatus according to the invention.

FIG. 4 is a schematic view illustrating an embodiment of the image-forming apparatus according to the invention.

The image-forming apparatus 100 shown in FIG. 4 is a full-color tandem image-forming apparatus that forms toner images in respective colors in respective toner image-forming units rotating in sync with the movement of an intermediate transfer belt by using four toner image-forming units corresponding respectively to four color toners in yellow, magenta, cyan, and black, superimposing these toner images on an intermediate transfer belt (primary transfer) as an intermediate medium, and transferring the toner images superimposed on the intermediate transfer belt (secondary transfer) onto paper as a recording medium, and fixing the image thereon.

The image-forming apparatus 100 shown in FIG. 4 has four toner image-forming units 110Y, 110M, 110C, and 110K, four primary transfer rolls 120, a semiconductive intermediate transfer belt 130 circulating counterclockwise supported by multiple supporting rolls 131, a secondary transfer unit 140 for secondary transfer, and a fixing unit 150 for fixing the unfixed toner image on paper. Among these constituent elements, the intermediate transfer belt 130 is made of the semiconductive polyimide film shown in FIG. 1.

The four toner image-forming units 110Y, 110M, 110C, and 110K are placed one by one along the circulating direction of the intermediate transfer belt 130, and each toner image-forming unit 110Y, 110M, 110C, or 110K has a clockwise-rotating photosensitive drum 111. The surface of each photosensitive drum 111 is in contact with the surface of intermediate transfer belt 130. Each primary transfer rolls 120 is placed at the opposite side of the intermediate transfer belt 130 from the photosensitive drum 111, and the region between the photosensitive drum 111 and the primary transfer roll is a primary transfer region.

Each toner image-forming unit 110Y, 110M, 110C, or 110K also has an electrostatic charging device 112, a developing device 113, and a cleaning device 114. The developing device 113 is placed upstream of the primary transfer region on the circumference of the photosensitive drum 111. The electrostatic charging device 112 is placed further upstream of the developing device 113. In addition, the cleaning device 114 is placed downstream of the primary transfer region on the circumference of the photosensitive drum 111.

The surface of the photosensitive drum 111 is charged uniformly by the electrostatic charging device 112. A laser beam corresponding to image information is irradiated from a light emitting device not shown in the figure onto the surface of the photosensitive drum 111 charged uniformly by the electrostatic charging device 112, forming an electrostatic latent image on the photosensitive drum 111 surface. The developing device 113 contains a toner, which is charged to a certain polarity in the developing device. In the developing device 113, the electrostatic latent image formed on the surface of the photosensitive drum 111 is developed with the toner charged to a certain polarity and a toner image is formed on the surface of the photosensitive drum 111. A primary transfer bias having a polarity opposite to that of toner is applied to the intermediate transfer belt 130 in the primary transfer region by the primary transfer roll 120. The toner image formed on the surface of photosensitive drum 111 is transferred by the action of the primary transfer bias from the photosensitive drum surface to the intermediate transfer belt 130 surface. The toner images formed on respective toner image-forming units 110Y, 110M, 110C, and 110K are superimposed on the intermediate transfer belt 130, to give a superimposed toner image.

In the primary transfer region, the toner not transferred to the intermediate transfer belt 130 and remaining on the photosensitive drum 111 is removed from the photosensitive drum 111 by the cleaning device 114.

The secondary transfer unit 140 has a secondary transfer roll 141 placed in contact with the surface of intermediate transfer belt 130 (toner image-carrying face), and a backup roll 142 placed at the rear face of the intermediate transfer belt 130, and these two rolls 141 and 142 hold the intermediate transfer belt 130 inside. The region held inside by these two rolls 141 and 142 is the secondary transfer region. In the secondary transfer region, a paper P is fed into the secondary transfer region in the same timing when the toner image, which is superimposed on the intermediate transfer belt 130, reaches the secondary transfer region. A secondary transfer bias having a polarity identical with that of toner is applied to the backup roll 142. The toner image superimposed on the intermediate transfer belt 130 is transferred by electrostatic repulsion from the intermediate transfer belt 130 on to the paper P by the action of the secondary transfer bias. The paper P discharged from the secondary transfer unit 140 is conveyed by the conveyor belt 160 to a fixing device 150. The fixing device 150 has a heating roll 151 having a heating mechanism inside and a fixing belt 152 pressed onto the heating roll 151. The paper P discharged from the secondary transfer region is supplied into the slit between the heating roll 151 and the fixing belt 152. The toner particles in the toner image on paper P are fused by the heating roll 151 and fixed on the paper P under the pressure by the fixing belt 152, forming a fixed toner image thereon.

A belt cleaner 170 is placed downstream of the secondary transfer unit 140 for removal of the toner remaining on the intermediate transfer belt 130.

Hereinafter, the intermediate transfer belt 130 made of the semiconductive polyimide film shown in FIG. 1 will be described in detail.

First, method for producing the intermediate transfer belt shown in FIG. 4 will be described with reference to FIG. 5.

Figure 5:
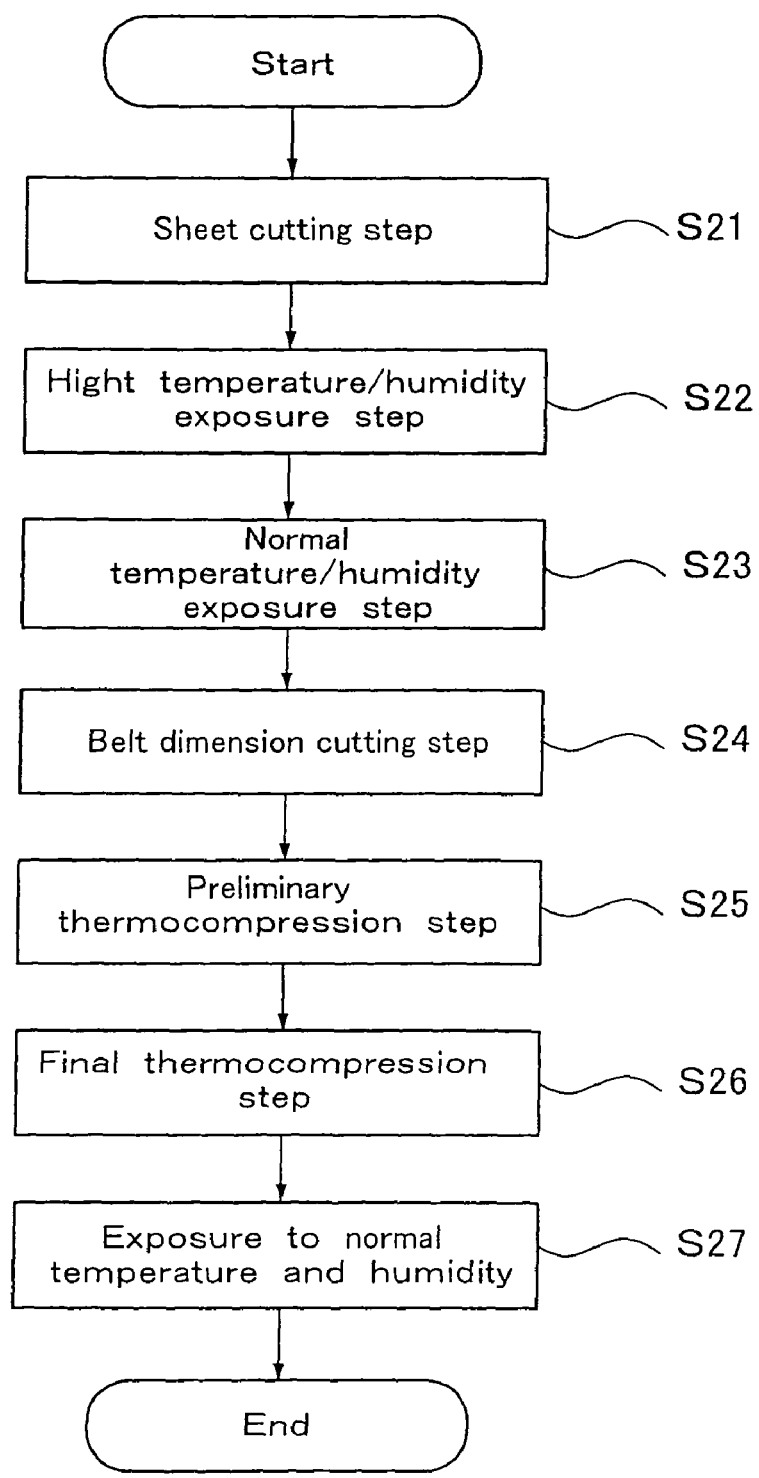
FIG. 5 is a flow chart illustrating a method of producing the intermediate transfer belt shown in FIG. 4.

FIG. 5 is a flow chart illustrating a method for producing the intermediate transfer belt shown in FIG. 4.

For production of the intermediate transfer belt 130 shown in FIG. 4, a film-shaped polyimide compound formed in Step S11 shown in FIG. 3 is prepared first, and a film having a length approximately required for producing an intermediate transfer belt 130 is cut off from the film-shaped polyimide compound (Step S21). The film-shaped polyimide compound for use may have a thickness of 0.050 to 0.500 mm, acceptably 0.060 to 0.300 mm, and more acceptably 0.060 to 0.150 mm. If the thickness is less than 0.050 mm, it is more difficult to satisfy the mechanical properties needed for the intermediate transfer belt, while if it is more than 0.500 mm, the polyimide compound may cause a problem that more cracks are formed on the belt surface by the stress derived from deformation of the areas thereof which become in contact with the supporting rolls 131 shown in FIG. 4. Further, the polyimide compound used may contain a filler (filler particles) having a particle diameter of 0.1 µm or more. If the particle diameter of the filler is less than 0.1 µm, it is almost impossible to raise the mechanical properties, while if it is 0.1 µm or more, it is possible to raise the mechanical properties further.

Subsequently, the polyimide compound cut off in Step S21 is wound and subjected to a high temperature and humidity exposure step (Step S22). In the similar manner to Step S12 shown in FIG. 3, the polyimide compound is also kept in an environment of a temperature of 45° C. and a humidity of 85% RH for 20 hours. In this step, the polyimide compound absorbs water and the polyaniline is further oxidized to become more conductive.

The polyimide compound kept under the high-temperature and humidity condition is then stored in an environment of normal temperature and humidity, i.e., a temperature of 22° C. and a humidity of 55% RH for 24 hours (Step S23). The surface resistivity and the volume resistivity of the intermediate transfer belt 130 shown in FIG. 4 may be adjusted by controlling the molecular weight of polyaniline and the amount thereof added in the step of forming a polyimide compound in Step S11 shown in FIG. 3, but the actual surface resistivity and volume resistivity are determined after it is kept in an environment of normal temperature and humidity, i.e., a temperature of 22° C. and a humidity of 55% RH for 24 hours. That is, exposure of the polyimide compound which was kept under the high-temperature and humidity condition to the standard condition, i.e., to normal temperature and humidity condition for 24 hours, allows release of the excessive water used during oxidation of polyaniline from the polyimide compound and thus leads the surface resistivity and volume resistivity of the polyimide compound into a more stabilized range. The release of excessive water from the polyimide compound also rectifies the length of the polyimide compound, which is elongated during the treatment, and stabilizes the dimension (shape) of the polyimide compound in the standard environment, i.e., in normal temperature and humidity environment.

After the dimension (shape) is stabilized under normal temperature and humidity condition, the polyimide compound is then cut off in a cutoff step (Step S24). In this cutoff step, the polyimide compound is cut into a belt in a desired shape. In the step, the polyimide compound after Steps S22 and S23 has no dimensional change in normal temperature and humidity environment and thus can be cut into a correct shape. In this embodiment, the polyimide compound is cut into a long flat belt providing a belt including joining regions having a cutoff dimension of a width of 362.0 mm and a peripheral length of 2110.0 mm.

Figure 6:
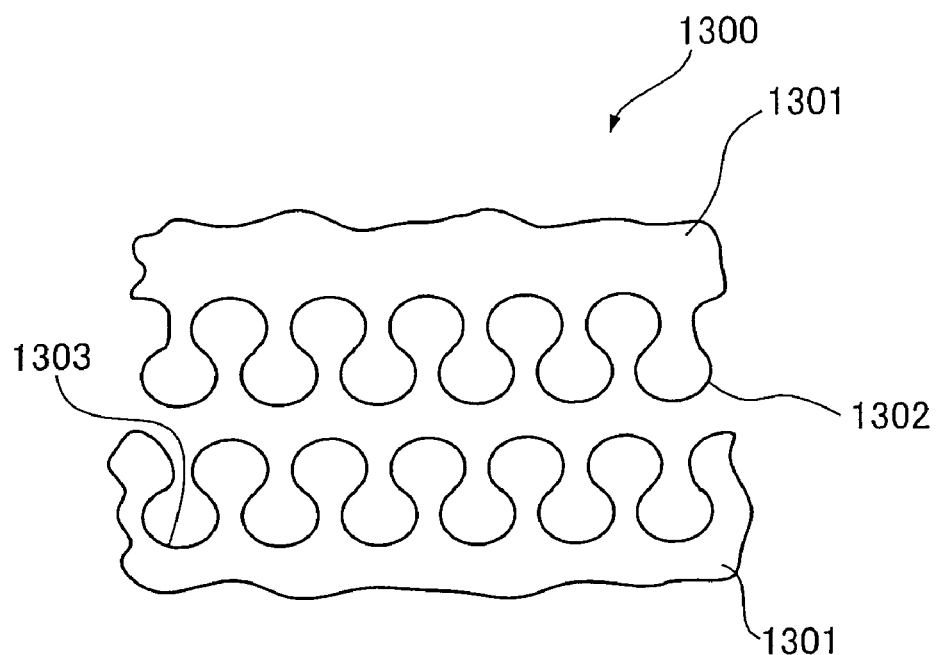
FIG. 6 is a view illustrating the end regions of a belt cut off in the longitudinal direction in cutoff step.

FIG. 6 is a view illustrating the joining regions at the ends in the longitudinal direction of the belt cut off in the cutoff step.

As shown in FIG. 6, the terminals 1301 of the belt 1300 in the longitudinal direction are stamped in a puzzle-cut pattern having protuberances 1302 and dents 1303 (cut pattern having mutually engaged multiple elements that cannot be separated in the horizontal direction once engaged) in Step S24 of the FIG. 5. The diameter of the protuberances 1302 and dents 1303 in the puzzle-cut pattern is about 1 mm, and the dimension of protuberances 1302 is smaller than that of dents 1303.

Both terminals 1301 of the belt thus cut are bound.

Figure 7:
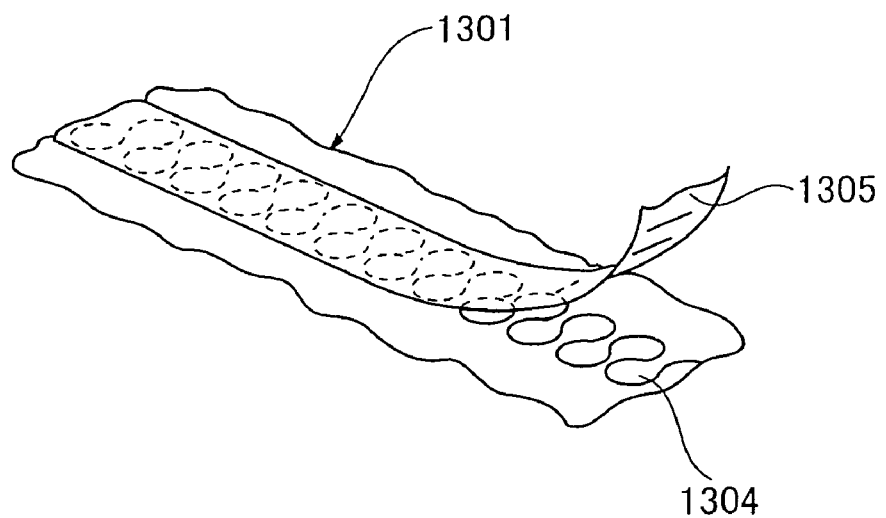
FIG. 7 is a view illustrating a way of connecting both terminals of the belt shown in FIG. 6.

FIG. 7 is a view illustrating the way connecting two terminals of the belt shown in FIG. 6.

As shown in FIG. 7, both terminals of the belt 1301 are engaged in the puzzle-cut pattern, forming a joining region 1304. Then, the joining region 1304 is covered with an adhesive tape 1305 having a thermosetting adhesive coated thereon and a release paper further over there, and the joining region 1304 covered with the adhesive tape 1305 is then heat-compressed (Step S25) temporarily, and additionally heat-compressed finally after removal of the release paper of the adhesive tape 1305 (Step S26).

Figure 9:
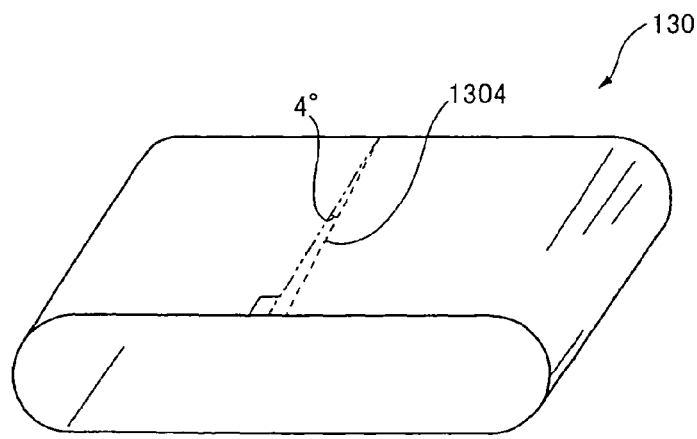
FIG. 9 is a perspective view illustrating an intermediate transfer belt produced via respective steps shown in FIG. 5.

In determining the compression temperature in the preliminary compression-bonding step S25 and the final compression-bonding step S26 of FIG. 5, a small test sample of the belt (semiconductive polyimide film 1 in FIG. 1) shown in FIG. 9 is withdrawn and subjected to analysis by differential scanning calorimetry (DSC). Results of the differential scanning calorimetry (DSC) of the semiconductive polyimide film 1 in FIG. 1 for use as the belt shown in FIG. 9 will be described below.

Figure 8:
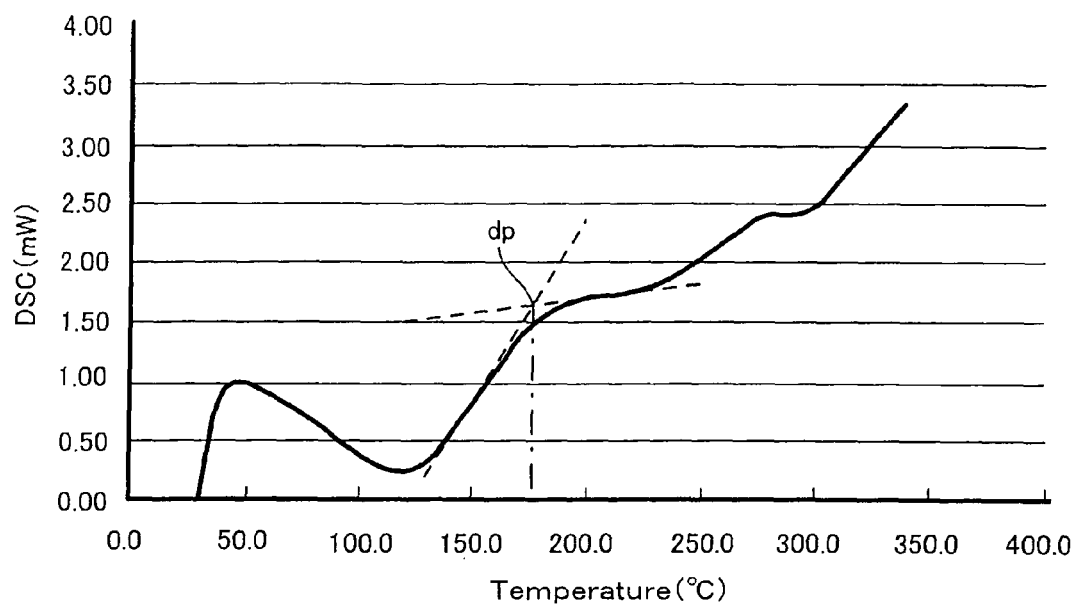
FIG. 8 is a graph showing results of differential scanning calorimetry of the belt shown in FIG. 6.

FIG. 8 is a graph showing the results of the differential scanning calorimetry of the belt shown in FIG. 9 (semiconductive polyimide film 1 in FIG. 1).

A heat-flow-rate differential scanning calorimeter DSC-50 manufactured by Shimadzu Corporation was used for the differential scanning calorimetry. The sample was heated from room temperature at a heating rate of 10° C./min, kept at 30° C. for 20 minutes, and then heated further to 330° C. The analysis was performed in air without use of nitrogen gas. The temperature and weight-decrease rate data were determined at an interval of 1 second.

In the graph shown in FIG. 8, the temperatures are plotted on the abscissa axis, and the DSC values (mW) on the ordinate axis. In the graph shown in FIG. 8, drawn is a differential thermal curve having inflection points corresponding to the intersections of the tangent lines at the points where the slope of curves changes from increase to decrease and where the slope of curve changes from decease to increase, or, corresponding to the intersections of the tangent lines at the points where the slope of curve changes from decease to increase and where the slope of curves from increase to decrease. The differential thermal curve shown in FIG. 8 has four inflection points in the measured temperature range of 150° C. or more, and among the temperatures of these four inflection points, the temperature closest to 150° C. is approximately 175° C. (temperature of the inflection point dp in FIG. 8). The belt shown in FIG. 9 becomes almost absolutely dry when heated to a temperature of 175° C. or more and should be subjected to Step S22 in FIG. 5.

For prevention of the decrease, the polyimide compound is heat-compressed at a temperature of 175° C. or less, either in the preliminary heat compression in Step S25 shown in FIG. 5 or the final heat compression in Step S26. That is, the compound is heat-compressed at a temperature of 140° C. for 1 minute in the preliminary heat-compression step S25 and at a temperature of 160° C. for 8 minutes in the final heat-compression in step S26, and in this manner, the belt is subjected to an endless processing without damaging the dimensional stability of the belt. The thermocompression is carried out under normal temperature and humidity condition in either case.

FIG. 9 is a perspective view illustrating the intermediate transfer belt 130 produced after respective steps shown in FIG. 5. The actual joining region 1304 is formed at an angle of 4° with respect to the width direction of the intermediate transfer belt 130 as shown in FIG. 9.

The endless belt having both terminals thermally compressed together with a thermosetting adhesive immediately after preparation has the joining region 1304 and the neighboring area shrunk in the width direction and waved on the surface, because the water in the joining region 1304 and the neighboring area is evaporated by the heat of thermocompression. The endless belt shrunk in the joining region 1304 and the neighboring area and having a waved surface is placed under normal temperature and humidity condition for 12 hours (Step S27). In this way, the joining region 1304 and the neighboring area reabsorb water in the environment and the shrunk joining region 1304 and the neighboring area return to the favorable dimensional accuracy.

The endless intermediate transfer belt 130 shown in FIG. 4 is produced in Steps S21 to S27 described above.

The front and rear surfaces of the intermediate transfer belt thus produced may be mechanically or chemically processed as needed. A roughened surface may be formed, for example, by sand blast method as the mechanical means or by chemical etching method as the chemical means. On the contrary, a smooth surface may be formed as needed by means of, for example, polishing.

The intermediate transfer belt 130 shown in FIG. 9 has favorable dimensional accuracy without cockles or the like caused by shrinkage in the joining region (seam region) 1304.

The surface resistivity of the intermediate transfer belt 130 shown in FIG. 9 is $10^{10}$ or more and $10^{14}\Omega/\square$ or less and acceptably $10^{11}\Omega/\square$ or more and $10^{13}\Omega/\square$ or less. If the surface resistivity is larger than $10^{14}\Omega/\square$, electrical exfoliation discharges occur more frequently in the post nip area where the photosensitive drum 111 and the intermediate transfer belt 130 shown in FIG. 4 are exfoliated, leading to deletion of images in the electrically discharged area. In contrast, if the surface resistivity is less than $10^{10}\Omega/\square$, the electric field strength in the pre-nip portion becomes too high, frequently causing gap discharges in the pre-nip area and occasionally worsening the graininess in image quality. Therefore, adjustment of the surface resistivity of the intermediate transfer belt in the range above allows prevention of deletion of images caused by the discharge generated when the surface resistivity is higher and the deterioration in image quality when the surface resistivity is lower.

In addition, the volume resistivity of the intermediate transfer belt 130 shown in FIG. 9 is $10^8$ $\Omega\cdot$cm or more and $10^{14}$ $\Omega\cdot$cm or less and may be $10^9$ $\Omega\cdot$cm or more and $10^{13}$ $\Omega\cdot$cm or less. If the volume resistivity is less than $10^8$ $\Omega\cdot$cm, the electrostatic force for retaining the electric charge on the unfixed toner image on the intermediate transfer belt 130 transferred from the photosensitive drum 111 becomes smaller, occasionally resulting in scattering of the toner particles around images (blur) and formation of images greater in noise, which are caused by the electrostatic repulsion among toner particles or the fringe electric field surrounding the image edge. In contrast, if the volume resistivity is higher than $10^{14}$ $\Omega\cdot$cm, a discharging mechanism will be needed, as the intermediate transfer body surface is charged by the transfer electric field during primary transfer due to its high charge-retaining capacity. Therefore, adjustment of the volume resistivity in the range above allows prevention of the scattering of toner particles and provides a solution to the problem of requiring a discharging mechanism.

Hereinafter, an image-forming apparatus having a configuration different from that of the image-forming apparatus shown in FIG. 4, and employing the intermediate transfer belt shown in FIG. 9, will be described by using the same numbers for the constituent elements as those used for the corresponding elements in the image-forming apparatus shown in FIG. 4.

Figure 10:
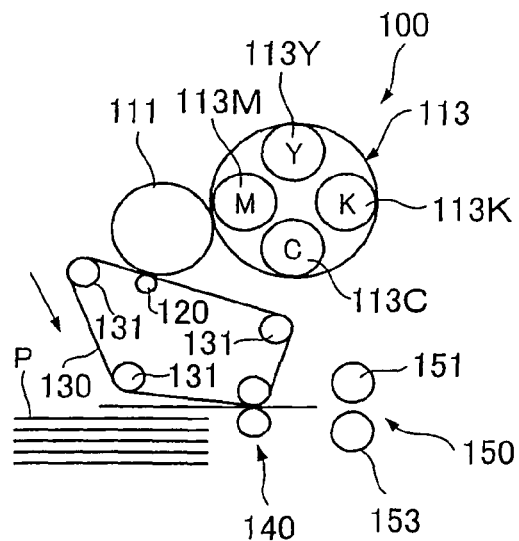
FIG. 10 is a schematic view illustrating the configuration of an image-forming apparatus equipped with a rotary developing device.

FIG. 10 is a schematic view of an image-forming apparatus equipped with a rotary developing device.

The image-forming apparatus 100 shown in FIG. 10 has an intermediate transfer belt 130 shown in FIG. 9 and a photosensitive drum 111. The image-forming apparatus 100 has only one photosensitive drum 111. The intermediate transfer belt 130 shown in FIG. 9 is placed in contact with the surface of the photosensitive drum 111, supported by multiple supporting rolls 131. The image-forming apparatus 100 has a primary transfer roll 120 at a position facing the photosensitive drum 111 at the opposite side of the intermediate transfer belt 130, and the region where the photosensitive drum 111 and intermediate transfer belt 130 becomes in contact is the primary transfer region.

A rotary developing device 113 is placed upstream of the primary transfer region on the circumference of the photosensitive drum 111. The rotary developing device 113 contains developing devices 113K, 113Y, 113M, and 113C, which contain color toners respectively in black (K), yellow (Y), magenta (M) and cyan (C). In addition, electrostatic charging, light emitting, and cleaning devices not shown in the figure are placed on the circumference of the photosensitive drum 111.

A secondary transfer unit 140 is placed downstream of the primary transfer region on the periphery of the intermediate transfer belt 130. The secondary transfer unit 140 shown in FIG. 10 has the same configuration as that of the secondary transfer unit shown in FIG. 4.

When each of the image signals in four colors, yellow, magenta, cyan and black, is input to the image-forming apparatus 100 shown in FIG. 10, photosensitive drum 111 is charged uniformly by the electrostatic charging device in this image-forming apparatus 100, and an electrostatic latent image is formed on the surface of the photosensitive drum 111, by irradiating a laser beam corresponding to cyan image signal, among the four kinds of image information, from the light emitting device onto the photosensitive drum 111. Then, the electrostatic latent image formed on the surface of the photosensitive drum 111 is developed by the cyan toner-containing developing device 113C in the rotary developing device 113 to form a cyan toner image on the surface of the photosensitive drum 111. Next, in the primary transfer region, the cyan toner image on the photosensitive drum 111 is transferred onto the intermediate transfer belt 130 (primary transfer). After the cyan toner image is primary transferred onto the intermediate transfer belt 130, toner particles remaining on the surface of the photosensitive drum 111 are removed by the cleaning device.

Subsequently, a magenta toner image is formed in a similar manner on the surface of the photosensitive drum 111, and primarily transferred onto the intermediate transfer belt 130 in the primary transfer region so that the magenta toner image superimposes the cyan toner image primarily transferred on the intermediate transfer belt 130 earlier.

Further, yellow and black toner images are formed sequentially, over the toner image primarily transferred on the intermediate transfer belt 130 earlier in the primary transfer position. In this way, a toner image transferred and superimposed in the order of cyan, magenta, yellow, and black from the belt surface is formed on the intermediate transfer belt 130.

The superimposed toner image is then retransferred to a paper P in the secondary transfer unit 140. An unfixed toner image is thus transferred onto the paper P, and the unfixed toner image-carrying paper P is sent to a fixing device 150. The fixing device 150 shown in FIG. 10 has a heating roll 151 and a pressure roll 153 pressed to the heating roll 151. The unfixed toner image-carrying paper P is sent into the slit between the mutually facing heating roll 151 and pressure roll 153. The toner particles in the toner image on paper P are fused by the heating roll 151, pressed by the pressure roll 153, and fixed on the paper P, providing a fixed toner image.

The intermediate transfer belt 130 shown in FIG. 9 can also be applied to an image-forming apparatuses 100 having a rotary developing device 113 mentioned in the above.

EXAMPLE

Hereinafter, the invention will be described with reference to EXAMPLES, but it should be understood that the invention is not limited by these EXAMPLE at all.

[Preparation of Semiconductive Polyimide Films]

<Preparation of Polyaniline Solution (A)>

A mixture of polyaniline powder having a certain molecular weight (10,000 to 50,000) and a dopant (an ester having an acid terminal prepared from an organic acid and a polyhydroxy compound) in DMAc is stirred under a nitrogen atmosphere until the mixture becomes a uniform solution, which is deaerated to give a polyaniline solution (A).

<Preparation of Polyamic Acid Solution (B)>

To DMAc, 4,4-diaminodiphenylether (ODA), 3,3',4,4'-biphenyltetracarboxylic dianhydride (BPDA) and pyromellitic dianhydride (PMDA) are added and the resulting mixture is stirred well under a nitrogen atmosphere. ODA, BPDA, and PMDA are blended at a molar ratio of 1.00:0.55:0.45, to give a polyamic acid solution (B).

<Preparation of Coating Solution (C)>

The polyaniline solution (A) and filler are added to the polyamic acid solution (B) in different three compositions, and the mixtures are stirred well and deaerated to give coating solutions (C1) to (C3). The filler used is an equivalent to ZELEC ECP-3005-XC (brand name, antimony-doped tin oxide having an average particle diameter of 1.0 to 3.0 μm) manufactured by du Pont, U.S.

The composition of the coating solution is adjusted in the following manner:

The amount of the polyaniline solution (A) added is first adjusted so that the surface resistivity and volume resistivity of the polyimide film after casting fall in a desired value, and other solid matters are added so that the weight ratio of polyimide:polyaniline:ZELEC becomes 100:28:14 in the coating solution, to give a coating solution (C1).

In a similar manner, coating solution (C2) is prepared at a ratio of polyimide:polyaniline:ZELEC of 100:21:14, and coating solution (C3), 100:35:14. In either coating solution, the amount of ZELEC contained in the polyimide film after casting is kept at a level where the resulting film does not become conductive.

<Preparation of Polyimide Film (D)>

Long films are formed by extruding the coating solutions (C1) to (C3) thus prepared via a T die onto a stainless steel endless belt and dried at 120° C. for 30 minutes and heated at 300° C. for 15 minutes, to give polyimide films (D1) to (D3) respectively. The amount of the coating solutions (C1) to (C3) is adjusted so that the film thickness of the polyimide films (D1) to (D3) obtained becomes 0.080 mm.

<Weight-Decrease Rate of Polyimide Films and Conditioning Condition>

Hereinafter, presented are examples related to the humidity conditioning condition and the weight-decrease rate of the polyimide films (D1) to (D3) prepared.

Example 1-1

The polyimide film (D1) obtained by the method above is cut into test samples in the suitable number and shape, and these samples are conditioned in a constant temperature and humidity bath at 28° C. and 85% RH. A sample conditioned at 28° C. and 85% RH is withdrawn one piece a week for four weeks and conditioned in an environment of 22° C. and 55% RH additionally for 24 hours, and the surface resistivity and volume resistivity thereof are determined under the same environment of 22° C. and 55% RH.

R8340A digital ultrahigh-resistance/minute-current ammeter (manufactured by Advantest Corporation) and UR Probe MCP-HTP12 and Regitape UFL MCP-STO3 having a double-ring electrode structure and a connecting port modified to fit to the R8340A digital ultrahigh-resistance/minute-current ammeter (both, manufactured by Dia Instruments Co., Ltd.) are used for measurement of the resistivity. A sample is placed on the Regitape UFL MCP-STO3 (having a fluorine resin face) with the measuring face facing upward and in contact with the double electrode of the UR Probe MCP-HTP12. The sample is pressed under a uniform load of 19.6±1 N by placing a weight on the UR Probe MCP-HTP12. Measuring conditions of the R8340A digital ultrahigh-resistance/minute-current ammeter are: charge time: 30 sec; discharge time: 1 sec; and applied voltage: 100V.

When the surface resistivity is designated as $\rho s$ and the reading of the R8340A digital ultrahigh-resistance/minute-current ammeter R, and the correction coefficient of the surface resistivity of UR Probe MCP-HTP12 RCF(S) in determining the surface resistivity, the surface resistivity is expressed by the following formula, wherein RCF(S) is 10.00 according to the catalogue "Ohm Meter Series Products" of Mitsubishi Chemical Corp. (Hereinafter, the surface resistivity is determined similarly.)

$$\rho s[\Omega/\square] = R \times RCF(S)$$
$$= R \times 10$$

In addition, when the volume resistivity is designated as $\rho v$; sample thickness, t (μm); and the reading of the R8340A digital ultrahigh-resistance/minute-current ammeter, R; and the volume resistivity correction coefficient of the UR Probe MCP-HTP12, RCF(V) in determining the volume resistivity, the volume resistivity can be calculated according to the following formula, wherein RCF(V) is 2.011 according to the catalogue "Ohm Meter Series Products" of Mitsubishi Chemical Corp. (hereinafter, the volume resistivity is determined similarly).

$$\rho v[\Omega \cdot cm] = R \times RCF(V) \times (10,000/t)$$

$$= R \times 2.011 \times (10,000/t)$$

A polyimide film (D1) immediately after preparation (under an environment of 28° C./85% RH for 0 hour) is used for reference.

Figure 11:
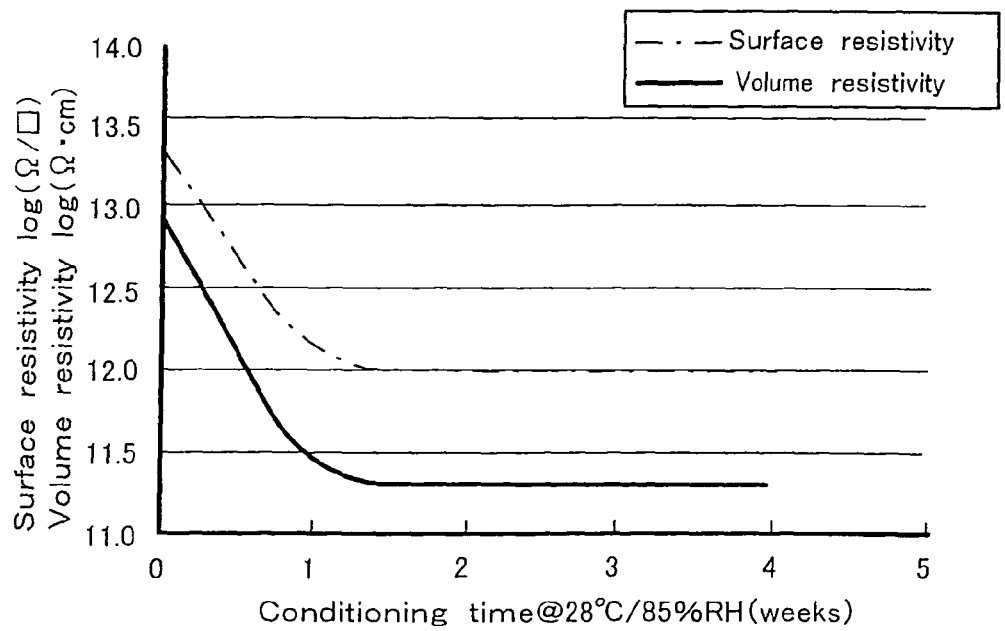
FIG. 11 is a graph showing the results of measuring the surface resistivity and volume resistivity in EXAMPLE 1-1.

FIG. 11 is a graph showing the measured values of the surface resistivity and volume resistivity of the sample of EXAMPLE 1-1.

The abscissa axis of the graph shown in FIG. 11 indicates periods (weeks) conditioned at 28° C./85% RH, while the ordinate axis shows the surface resistivity (common logarithmic value) (log [Ω/☐]) and the volume resistivity (common logarithmic value) (log [Ω·cm]). In this graph, the change in surface resistivity is shown by a dashed line and the change in volume resistivity by a solid line. As apparent from this FIG. 11, in an environment of 28° C. and 85% RH, both of the surface resistivity and volume resistivity declined rapidly in a week.

Separately, the change in the surface and volume resistivity over time of the sample conditioned at 28° C. and 85% RH for 1 week is determined in an environment of 22° C. and 55% RH.

Figure 12:
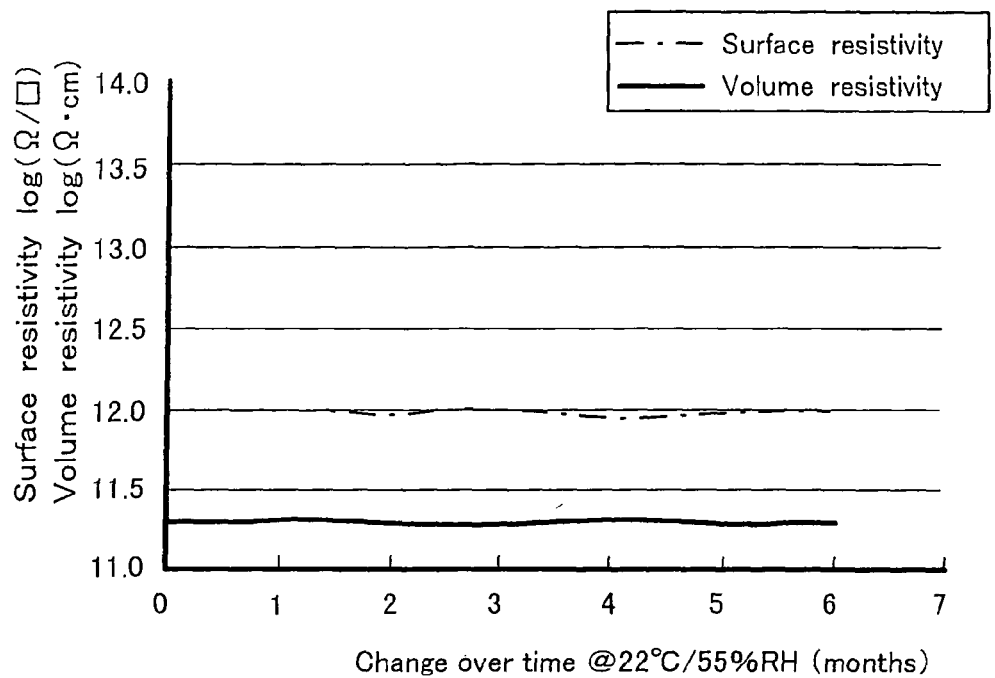
FIG. 12 is a graph showing the results of measuring the change over time in the surface resistivity and volume resistivity of a sample conditioned at 28° C. and 85% RH for one week.

FIG. 12 is a graph showing the change in the surface resistivity and volume resistivity of a sample conditioned at 28° C. and 85% RH for 1 week.

The graph shown in FIG. 12 is drawn in a similar manner to the graph shown in FIG. 11, except that the abscissa axis represents the periods (months) stored in an environment of 22° C./55% RH. The graph shown in FIG. 12 indicates that the surface resistivity and volume resistivity remain almost constant respectively after six months. Therefore, it seems that the surface resistivity and volume resistivity of the sample are stabilized after conditioning in an environment of 22° C. and 55% RH for 24 hours. The surface resistivity (common logarithmic value) is 12.0 log(Ω/☐) and the volume resistivity (common logarithmic value) is 11.3 log (Ω·cm) after they reach a sufficiently stabilized region.

Separately, the weight-decrease rate of a sample whose resistivity reached a sufficiently stabilized region is determined.

The weight-decrease rate is determined by thermogravimetric analysis by using a simultaneous differential thermal and thermogravimetric analyzer DTG-50 manufactured by Shimadzu Corporation. The sample is heated from room temperature at a heating rate of 10° C./min, held at 30° C. for 20 minutes, and then further heated to 300° C. The analysis is performed in air without use of nitrogen gas. The temperature and the weight-decrease rate data are determined at an interval of 1 second (hereinafter, the weight-decrease rate data are determined similarly).

The weight-decrease rate of the sample whose resistivity reached a sufficiently stabilized region is −1.68%.

Example 1-2

The weight-decrease rate is determined in a similar manner to EXAMPLE 1-1, except that polyimide film (D2) is used replacing the polyimide film (D1) of EXAMPLE 1-1.

As a result, the weight-decrease rate of the sample whose resistivity reached a sufficiently stabilized region is −1.4%.

Example 1-3

The weight-decrease rate is determined in a similar manner to EXAMPLE 1-1, except that polyimide film (D3) is used replacing the polyimide film (D1) of EXAMPLE 1-1.

As a result, the weight-decrease rate of the sample whose resistivity reached a sufficiently stabilized region is −1.9%.

Example 2

In a similar manner to EXAMPLE 1-1, the polyimide film (D1) obtained is cut into test samples in the suitable number and shape, and these samples are conditioned in a constant temperature and humidity bath at 45° C. and 85% RH. From the samples conditioned at 45° C. and 85% RH, a sample is withdrawn at an interval of 3 hours during the first 24 hours and at an interval of 24 hours after then till a total of 168 hours (1 week) and conditioned in an environment of 22° C. and 55% RH additionally for 24 hours, and the surface resistivity and volume resistivity thereof are determined under the same environment of 22° C. and 55% RH.

A polyimide film (D1) immediately after preparation (under the environment of 45° C./85% RH for 0 hour) is used for reference.

Figure 13:
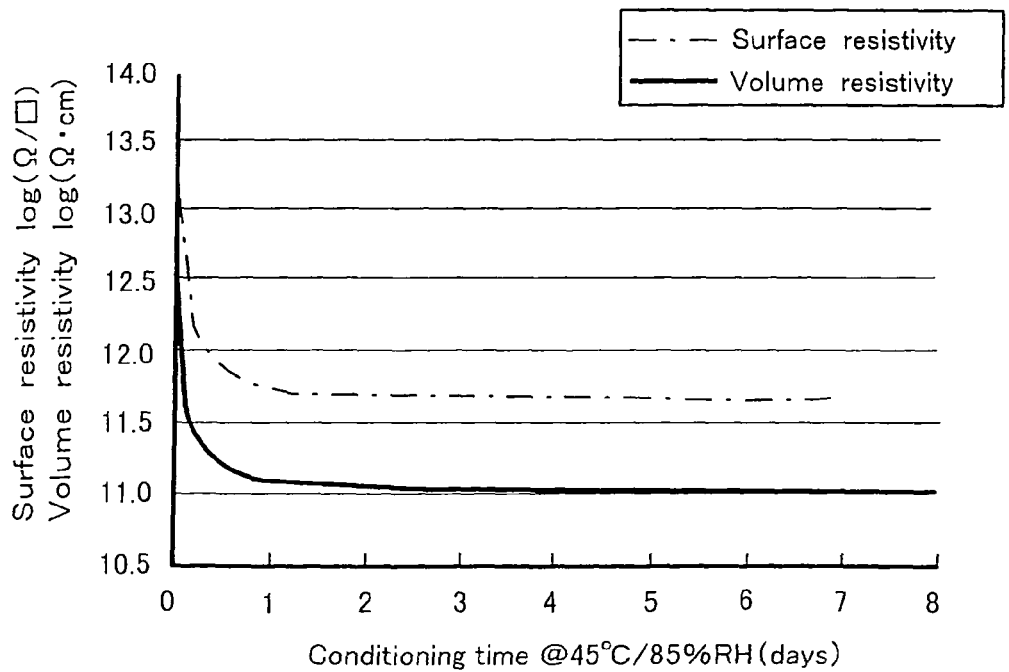
FIG. 13 is a graph showing the results of measuring the surface resistivity and volume resistivity in EXAMPLE 2.

FIG. 13 is a graph showing the measured surface resistivity and volume resistivity of the samples of EXAMPLE 2.

The graph shown in FIG. 13 is drawn in a similar manner to the graph shown in FIG. 11, except that the abscissa axis represents the periods (days) during which the samples are conditioned in an environment of 45° C. and 85% RH. As shown in the graph of FIG. 13, the surface resistivity and volume resistivity of the sample decline rapidly in an environment of 45° C. and 85% RH than in an environment of 28° C. and 85% RH and reach values almost in the stabilized region.

Then, change over time in the surface resistivity and volume resistivity of the sample conditioned at 45° C. and 85% RH for 18 hours over time is determined in an environment of 22° C. and 55% RH.

Figure 14:
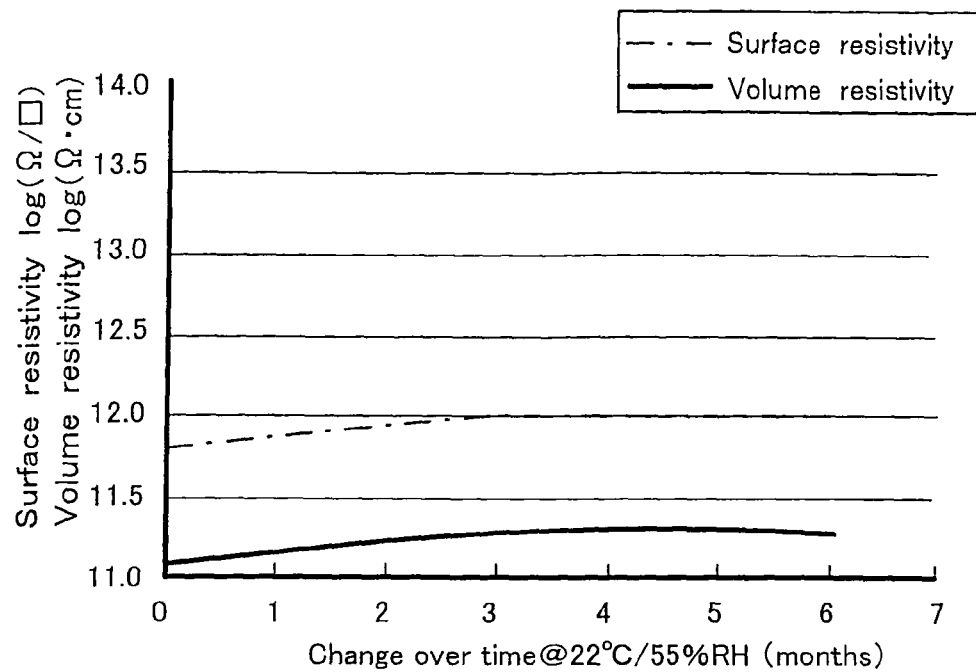
FIG. 14 is a graph showing results of measuring the change over time in the surface resistivity and volume resistivity of a sample conditioned at 48° C. and 85% RH for 18 hours.

FIG. 14 is a graph showing the measured surface resistivity and volume resistivity of the sample conditioned at 45° C. and 85% RH for 18 hours.

The graph shown in FIG. 14 is drawn in a similar manner to the graph shown in FIG. 12. As shown in the graph of FIG. 14, the sample had at first a surface resistivity (common logarithmic value) of 11.8 log (Ω/☐) and a volume resistivity (common logarithmic value) of 11.1 log (Ω·cm), but the surface resistivity (common logarithmic value) rises to 12.0 log (Ω/☐) by an increase of approximately 0.2 log (Ω/☐) after three months. In addition, the volume resistivity (common logarithmic value) also rises to 11.3 log (Ωcm) by an increase of approximately 0.2 log (Ωcm). Both the surface resistivity and the volume resistivity remain constant after then for three months.

Further, thermogravimetric analysis of the sample after six months revealed that it has a weight-decrease rate of −1.65%.

Example 2-1

The sample, of which the change over time in the surface resistivity and volume resistivity is followed in an environment of 22° C. and 55% RH during a period of six months in EXAMPLE 2 (sample after six months), is conditioned additionally in an environment of 28° C. and 85% RH for 24 hours, and the surface resistivity and the volume resistivity are determined in an environment of 28° C. and 85% RH.

As described above, the surface resistivity (common logarithmic value) and the volume resistivity (common logarithmic value) of the sample, which reached a stable region after six months, are respectively 12.0 log (Ω/☐) and 11.3 log (Ω·cm), but decrease to 11.4 log (Ω/☐) and 10.7 log (Ω·cm) after conditioning in an environment of 28° C. and 85% RH for 24 hours. After the sample decreased in resistivity is returned to and conditioned in an environment of 22° C./55% RH for 12 hours, the surface resistivity (common logarithmic value) and the volume resistivity (common logarithmic value) are respectively 11.9 log ($\Omega/\square$), 11.2 log ($\Omega\cdot$cm), revealing that the surface resistivity and volume resistivity almost return to the values in stabilized region in an environment of 28° C. and 85% RH for 24 hours, although slightly lower than the values before the conditioning.

Example 2-2

The sample (sample after six months), of which the change over time in surface resistivity and volume resistivity are followed for six months in an environment of 22° C. and 55% RH in EXAMPLE 2, is then conditioned in an environment of 10° C. and 15% RH for 24 hours and the surface resistivity and volume resistivity thereof are determined in an environment of 10° C. and 15% RH.

As a result, after room temperature conditioning at 10° C. and 15% RH, the surface resistivity (common logarithmic value) increased to 12.6 log ($\Omega/\square$) and the volume resistivity (common logarithmic value) to 11.9 log ($\Omega\cdot$cm). The sample increased in resistivity is further returned to and conditioned in an environment of 22° C./55% RH for 12 hours, and the surface resistivity (common logarithmic value) and the volume resistivity (common logarithmic value) measured are respectively 12.0 log ($\Omega/\square$) and 11.3 log ($\Omega\cdot$cm), indicating that the sample has surface resistivity and volume resistivity in the stabilized region similar to those before the conditioning in an environment of 10° C. and 15% RH for 24 hours.

Example 3

Figure 16:
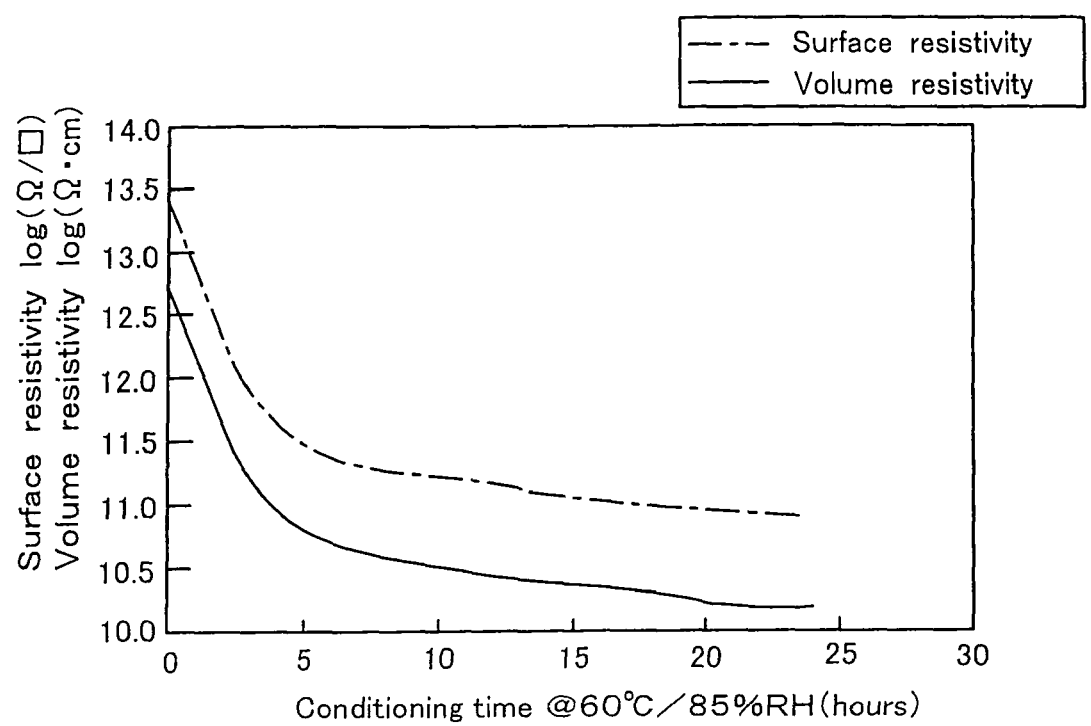
FIG. 16 is a graph showing the results of measuring the surface resistivity and volume resistivity in EXAMPLE 3.

The film (D1) obtained is cut into test samples in the suitable number and size in a similar to EXAMPLE 1-1 and a required number of samples are conditioned in a constant temperature and humidity bath at 60° C. and 85% RH. A sample conditioned at 60° C. and 85% RH is withdrawn at an interval of 3 hours for 24 hours and conditioned in an environment of 22° C. and 55% RH additionally for 24 hours, and the surface resistivity and volume resistivity thereof are determined under the same environment of 22° C. and 55% RH. A film (D1) immediately after production (under an environment of 60° C. and 85% RH for 0 hour) is used for reference. As shown in FIG. 16, because both the surface resistivity and volume resistivity decreased rapidly in a shorter term than those in FIG. 13, the sample conditioned at 60° C. and 85% RH for 3 hours is further conditioned in an environment of 22° C. and 55% RH for additional 24 hours until it reaches the stabilized region. The surface resistivity (common logarithmic value) is 11.9 ($\Omega/\square$) and the volume resistivity (common logarithmic value) is 11.2 log ($\Omega$cm) at that time. The weight-decrease rate as determined by thermogravimetric analysis when the sample reaches the stabilized region is −1.66%.

Comparative Example 1

A polyimide film (d) is cut into test samples in the suitable size, and the surface resistivity and volume resistivity of the samples over time are determined while the sample is kept and conditioned in an environment of 22° C. and 55% RH.

Figure 15:
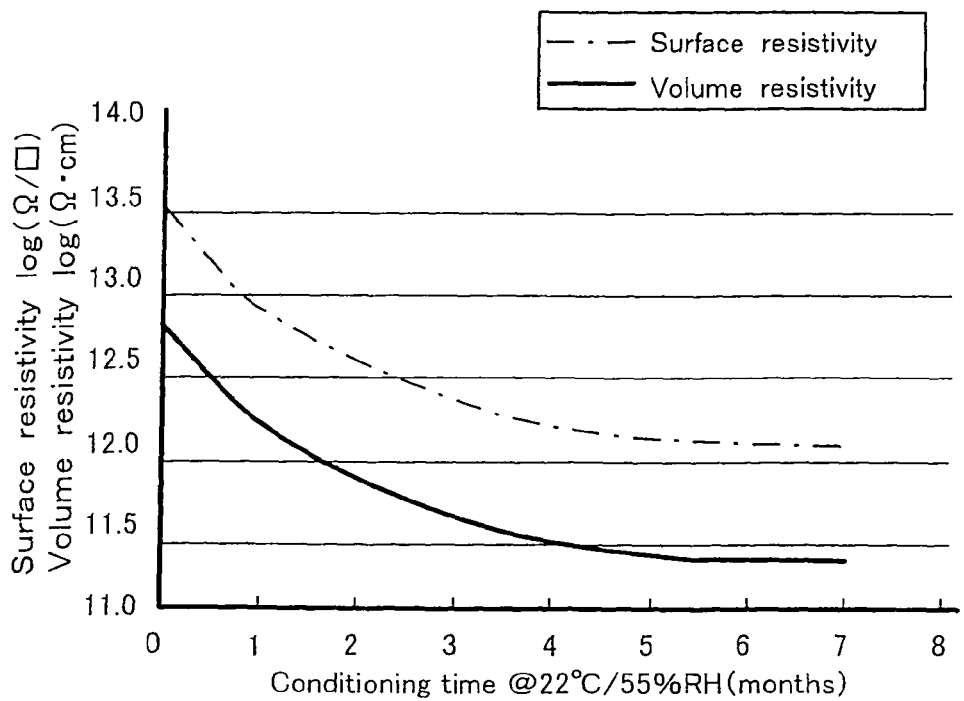
FIG. 15 is a graph showing the results of measuring the surface resistivity and volume resistivity in COMPARATIVE EXAMPLE 1.

FIG. 15 is a graph showing the measured surface resistivity and volume resistivity of the samples of COMPARATIVE EXAMPLE 1.

The graph shown in FIG. 15 is drawn in a similar manner to the graph shown in FIG. 11, except that the abscissa axis represents the periods (months) during which the samples are stored in an environment of 22° C. and 55% RH.

The graph shown in FIG. 15 indicates that both the surface resistivity and volume resistivity decrease gradually in an environment of 22° C. and 55% RH. Specifically, the surface resistivity (common logarithmic value) of the polyimide film immediately after production (conditioning in an environment of 22° C. and 55% RH for 48 hours or less) is 13.4 log ($\Omega/\square$), and the volume resistivity (common logarithmic value), 12.7 log ($\Omega\cdot$cm). The weight-decrease rate of the polyimide film immediately after production as determined by thermogravimetric analysis is −0.01 to −0.05%. The surface resistivity (common logarithmic value) of the sample kept and conditioned in an environment of 22° C. and 55% RH for one month is 12.8 log ($\Omega/\square$); volume resistivity (common logarithmic value), 12.1 log ($\Omega$cm), and the surface resistivity (common logarithmic value) of the sample after five months (after a total of six months), 12.0 log ($\Omega/\square$); and the volume resistivity (common logarithmic value), 11.3 log ($\Omega\cdot$cm). The results of EXAMPLES 1 and 2 indicate that taking into account the fact that the surface resistivity (common logarithmic value) of the polyimide film in the stabilized region is 12.0 log ($\Omega/\square$); the volume resistivity (common logarithmic value), 11.3 log ($\Omega\cdot$cm), it takes approximately six months for both the surface resistivity and volume resistivity to reach a certain stabilized region in an environment of 22° C. and 55% RH.

In addition, the weight-decrease rate of the sample kept and conditioned in an environment of 22° C. and 55% RH for six months as determined by thermogravimetric analysis is −1.66%.

The results above indicate that the surface resistivity and volume resistivity of a polyimide film after preparation of the polyimide film (after imide-ring closure) can be brought into a stabilized region in a shorter period in a high temperature and high humidity environment (e.g., 28° C. and 85% RH or 45° C. and 85% RH) than under normal temperature and humidity environment (e.g. 22° C. and 55% RH in COMPARATIVE EXAMPLE 1). It seems that although the polyimide film (d) immediately after production (conditioned in an environment of 22° C. and 55% RH for 48 hours or less) is not provided with sufficient conductivity, storage thereof in an high temperature and high humidity environment accelerates oxidation of polyaniline, providing the polyaniline with conductivity and bringing the surface resistivity and volume resistivity sooner into the stabilized region. If a polyimide film is kept in a high-temperature environment (e.g. 45° C.) without humidity, the film is not oxidized sufficiently and does not regain a surface resistivity or a volume resistivity in the stabilized region, even when it is kept in an environment of 22° C. and 55% RH for 12 hours or more. As the polyimide is hygroscopic as it is and the polyaniline is more hygroscopic, both the surface resistivity and volume resistivity are affected by the water present in the polyimide film. Accordingly, the surface resistivity and volume resistivity of a polyimide film in the stabilized region should be determined under the standard environment (e.g. 22° C. and 55% RH).

When a polyimide film (d) having a total area of about 200 m² is conditioned for 18 hours with the entire face exposed to air and not in contact with each other in a constant temperature and humidity bath of about 30 m³ in volume, controlled at 45° C. and 85% RH, the oxygen concentration thereof dropped by about 0.5% after the conditioning.

Further, the results in EXAMPLES 2-1 and 2-2 suggest an environmental dependency that even a sample having the surface resistivity and volume resistivity in the stabilized region can have different level of the surface and volume resistivity when stored under a different environment (e.g. 28° C. and 85% RH or 10° C. and 15% RH) and measured under the same environment. However, the surface resistivity and volume resistivity of the polyimide film once brought into the stabilized region return to the surface and volume resistivity in the original stabilized region by conditioning under the standard environment (e.g. environment of 22° C. and 55% RH) for 12 hours or more.

In the following example, the conditions for producing an endless intermediate transfer belt from the polyimide film (d) prepared will be described.

Example 4

Polyimide films have generally certain levels of thermal and humidity expansion coefficients, and thus when processed into a belt, the dimension thereof varies according to the change in environment. Therefore, it is acceptable to condition the film before it is processed into a belt. The conditioning may be performed either in the condition shown in EXAMPLE 1 or 2. As it is found that the use of the humidity conditioning condition used for stabilization of surface resistivity and volume resistivity, particularly the condition of the "conditioning in an environment of 45° C. and 85% RH for 18 hours and subsequently in an environment of 22° C. and 55% RH for 24 hours" (hereinafter, referred to as standard humidity conditioning condition), is effective in providing favorable effects on dimensional stability without a need for additional humidity-conditioning step, the polyimide film (D1) is conditioned under the standard water-content conditioning condition. Then, the polyimide film (D1) after conditioning is cut into a piece suitable in size for processing a belt in an environment of 22° C. and 55% RH. A small piece of polyimide film (D1) prepared during the cutoff is analyzed by differential scanning calorimetry, and the transition temperature thereof is determined from the inflection point closest to and higher than 150° C. in the differential thermal curve.

For differential scanning calorimetry, an instrument identical with that used for thermogravimetric analysis, i.e., a simultaneous differential thermal and thermogravimetric analyzer DTG-50 manufactured by Shimadzu Corporation, is used. The sample is heated from room temperature at a heating rate of 10° C./min, held at 30° C. for 20 minutes, and heated additionally to 330° C. The analysis is performed in air without use of nitrogen gas. The temperature and the weight-decrease rate data are determined at an interval of 1 second.

The transition temperature of the polyimide film (D1) is 175.2 to 177.8° C. (measured sample number: 5).

Then, both ends of the belt are cut in a puzzle form as shown in FIG. 6, and the terminal puzzle-cut patterns are engaged with each other as shown in FIG. 7 to form a joining region. The joined region is then covered with an adhesive tape coated with a thermosetting adhesive on the rear face (width: 5 mm, TB1650, manufactured by Three Bond Co., Ltd.), and the adhesive tape-covered joined region is thermally compressed. The thermocompression is carried out by heating and pressing the joined region by a seal bar. The variation in temperature of the seal bar in the belt width direction is ±10° C. with respect to the set temperature. The set temperature of the seal bar is 160° C. (practically 150 to 170° C.) to make the entire width of seal bar at the transition temperature of 175.2 to 177.8° C. The period of the thermocompression is 480 seconds and the pressure, 0.3 to 0.4 MPa (effective area of seal bar: 10 mm×380 mm). Five intermediate transfer belts having a width of 362.0 mm and an inner peripheral length of 2111.0 mm or more are prepared by thermocompression under the conditions above.

The shrinkage of the joining region (seam region) in each of the five intermediate transfer belts immediately after the thermocompression is determined.

The shrinkage is determined by the difference in the belt width in the seam region before and after thermocompression. For measurement of the belt width, used is a glass scale with an extra magnifying glass that allows direct reading at a 0.1 mm scale (hereinafter, shrinkages are determined in a similar manner).

The shrinkage is 1.0 to 1.1 mm with respect to a belt width of 362.0 mm.

The amount of waveness in the joined region after thermocompression is also determined.

After an intermediate transfer belt is stretched by two rods of 28 mm in diameter under a tension of 50 N, the amount of waveness in the belt width direction at a distance of 22 mm from the center of the rod when one side of the joined region (closer to an rod) is located at a distance of 31 mm from the center of one rod (outer diameter: φ 28 mm) is determined. The amount of waveness is defined as the peak-to-peak distance of the waves. As the edges of the belt in the width direction often curl toward inside, measured values in the area within 20 mm from the edges are excluded in calculation of the amount of waveness. The amount of waveness is determined by using a CCD laser displacement sensor LK030 and an amplification unit LK-2000 manufactured by KEYENCE Corporation and by moving the CCD laser displacement sensor LK030 positioned at 30±5 mm above the belt surface in parallel with the belt surface (hereinafter, the amounts of waveness are determined similarly).

The amount of waveness is 0.50 to 0.70 mm.

Then, these five intermediate transfer belts are kept in an environment of 22° C. and 55% RH for 24 hours, and the resulting shrinkages drop to 0.2 to 0.3 mm. The amounts of waveness also drop to 0.30 to 0.50 mm. When the belt is installed in the image-forming apparatus shown in FIG. 4 and 20% and 30% magenta half tone images are output respectively, no irregularity in density caused by the waveness is observed in the neighborhood of the seam region of intermediate transfer belt. When the intermediate transfer belt thus prepared is placed in the image-forming apparatus and driven for 135 k cycles, no accident, such as exfoliation, breakage, or the like, is observed in the seam region. Further, when a region including the seam region is cut off from the intermediate transfer belt and the breaking strength (tensile strength) thereof is determined, it is confirmed to be approximately 3.8 KN/m, satisfying the requirement in breaking strength for the seam region at 1.0 KN/m.

Comparative Example 2

A polyimide film is thermally compressed by a seal bar set at a temperature of 200° C., which is higher than the transition temperature of the polyimide film. Considering the variation in temperature of the seal bar, the film is heated practically at a temperature of 190° C. to 21° C. In this experiment too, five intermediate transfer belts identical in size with that in EXAMPLE 3 are prepared; the shrinkages of the respective belt seam regions are determined immediately after thermocompression; and the shrinkages are 1.5 to 1.6 mm with respect to a belt width of 362.0 mm. The amount of waveness is as high as 0.85 to 1.15 mm.

After these five intermediate transfer belts are kept in an environment of 22° C. and 55% RH for 24 hours, the shrinkages decrease slightly to 0.3 to 0.4 mm. In addition, the amounts of waveness also decrease slightly to 0.75 mm to 0.95 mm. When these five intermediate transfer belts each are placed in the image-forming apparatus shown in FIG. 4 one by one and 20% and 30% magenta half tone images are output respectively thereon, the waveness in the neighborhood of the seam regions causes slight irregularity in density in one of the five belts and deletion of images in the other four belts. Further, after intensive studies, the irregularity in density and deletion of images are found to occur frequently when the amount of waveness is more than 0.7 mm.

Comparative Example 3

The temperature of the seal bar is set at 140° C. Five intermediate transfer belts are prepared in the similar manner to EXAMPLE 4, except that the temperature is set at less than 150° C., practically 130 to 150° C., considering the variation in temperature, and the shrinkages of the respective belt seam regions are determined immediately after thermocompression. The shrinkages are 0.5 to 0.6 mm with respect to a belt width of 362.0 mm. The amounts of waveness are 0.40 to 0.50 mm. When the belts are kept in an environment of 22° C. and 55% RH for 24 hours, the shrinkages drop to 0.1 to 0.2 mm. The amounts of waveness drop to 0.2 to 0.3 mm. When these five intermediate transfer belts each are placed in the image-forming apparatus shown in FIG. 4 one by one and 20% and 30% magenta half tone images are output respectively thereon, no irregularity in density is observed due to the waveness in the neighborhood of the seam regions of the intermediate transfer belts. However, when the intermediate transfer belt thus prepared is placed in an image-forming apparatus and driven for 135 k cycles in the similar manner to EXAMPLE 4, the adhesiveness between the adhesive and the seam region is lower due to a lower temperature of the seal bar of 140° C., resulting in accidents such as deformation by the rolls and exfoliation of part of the adhesive during cleaning of the toner with a cleaner blade.

When a belt-joining region is thermally compressed, water in the polyimide film is evaporated, occasionally causing local shrinkage deformation in the polyimide film, depending on the temperature of thermocompression. The local shrinkage deformation in the polyimide film is likely to contain a reversible aspect derived from the hygroscopicity observable in the surface resistivity and volume resistivity, and an irreversible aspect that prohibits the film to recover even when stored in an environment of 22° C. and 55% RH for 24 hours. From the results in EXAMPLE 4, it is found that adjustment of the thermocompression temperature at a temperature of 150° C. or more and not more than the inflection temperature closest to 150° C. observed in the DTA curve or less allows reduction in thermal shrinkage deformation of the polyimide film and provides favorable seam properties.

The entire disclosure of Japanese Patent Application No. 2004-087306 filed on Mar. 24, 2004 including specification, claims, drawings and abstract is incorporated herein by reference in its entirety.

What is claimed is:

1. A method for producing a polyimide film, comprising steps of:
   forming a polyimide compound having a polyimide as the primary constituent and containing at least a polymeric conductive agent into a film shape;
   exposing to high temperature and humidity the film-shaped polyimide compound formed in the step of forming the polyimide compound wherein the polyimide compound is kept in an environment of a temperature of 27° C. or more and a humidity of 70% or more;
   exposing to normal temperature and humidity the film-shaped polyimide compound after being exposed to the environment of the temperature of 27° C. or more and the humidity of 70% or more in the step of exposing to high temperature and humidity, wherein the polyimide compound is kept in an environment of a temperature lower than 27° C. and a humidity lower than 70%,
   cutting into a long belt the film-shaped polyimide compound after the step of exposing to normal temperature and humidity;
   stamping each of both ends of the long belt in a puzzle-cut pattern having a plurality of protuberances, each of which protrudes in a longitudinal direction of the long belt and which are positioned along a width direction of the long belt that is across the longitudinal direction, and a plurality of dents which are positioned between the plurality of protuberances respectively along the width direction, wherein the puzzle-cut patterns of the both ends are patterns in which the plurality of protuberances of one end of the both ends engage with the plurality of dents of other end of the both ends respectively in such a manner that the both ends are kept from separating from each other in the longitudinal direction; and
   connecting the both ends of the long belt, which is in a state that the plurality of protuberances of the one end of the both ends engage with the plurality of dents of the other end of the both ends respectively, with a predetermined adhesive member.

2. The method for producing a polyimide film according to claim 1, wherein the polymeric conductive agent contains polyaniline and a dopant for making the polyaniline conductive.

3. The method for producing a polyimide film according to claim 1, wherein the rate of the temperature increase is 10° C./min when the polyimide film is heated gradually from 30° C.

4. The method for producing a polyimide film according to claim 1, wherein a diameter of each of the plurality of protuberances of the one end of the both ends is smaller than that of each of the plurality of dents of the other end of the both ends which engages with the each of the plurality of protuberances of the one end of the both ends.

5. The method for producing a polyimide film according to claim 1, wherein the polyimide compound in the step of exposing to normal temperature and humidity is kept in an environment of a temperature of about 22° C. and a humidity of about 55%.

6. A method for producing an endless intermediate transfer belt for use in an image-forming apparatus that forms an image on a recording medium by forming a toner image on an image carrier and transferring and fixing the toner image finally on the recording medium, having an intermediate transfer belt in contact with the image carrier whereon the toner image is formed for receiving the toner image from the image carrier once by application of a bias voltage and transferring the toner image onto the recording medium, comprising steps of:
   exposing a film-shaped polyimide compound to high temperature and humidity at a temperature of 27° C. or more and a humidity of 70% RH or more, the film-shaped polyimide compound having a polyimide as the primary constituent, containing at least a polymeric electroconductive material and having a differential thermal characteristic in which a differential thermal curve is created, the differential thermal curve at a temperature of 150° C. or more having a plurality of inflection points corresponding to an intersection between a tangent line passing a point of a change from increase to decrease in the slope of the curve and a tangent line passing a point of a change from decrease to increase in the slope of the curve;

exposing to normal temperature and humidity the film-shaped polyimide compound after being exposed to the environment of the temperature of 27° C. or more and the humidity of 70% or more in the step of exposing to high temperature and humidity, wherein the polyimide compound is kept in an environment of a temperature lower than 27° C. and a humidity lower than 70%;

cutting into a long belt the film-shaped polyimide compound after the step of exposure to high temperature and humidity;

heat-compressing the long belt by connecting both ends of the long belt cut off in the step of cutting into a long belt with an adhesive and heating and compressing the connected both ends at a temperature in a range of 150° C. or more to the inflection point closest to 150° C. where the slope of the differential thermal curve becomes smaller, and stamping each of both ends of the long belt, cut in the step of cutting, in a puzzle-cut pattern having a plurality of protuberances, each of which protrudes in a longitudinal direction of the long belt and which are positioned along a width direction of the long belt that is across the longitudinal direction, and a plurality of dents which are positioned between the plurality of protuberances respectively along the width direction, wherein the puzzle-cut patterns of the both ends are patterns in which the plurality of protuberances of one end of the both ends engage with the plurality of dents of other end of the both ends respectively in such a manner that the both ends are kept from separating from each other in the longitudinal direction, wherein the step of heat-compressing is a step of heat-compressing the long belt by connecting the both ends of the long belt, which is in a state that the plurality of protuberances of the one end of the both ends engage with the plurality of dents of the other end of the both ends respectively, with the adhesive and heating and compressing the connected both ends at the temperature in the range.

7. The method for producing an intermediate transfer belt according to claim 6, wherein the polymeric conductive agent contains polyaniline and a dopant for making the polyaniline conductive.

8. The method for producing a polyimide film according claim 6, wherein a diameter of each of the plurality of protuberances of the one end of the both ends is smaller than that of each of the plurality of dents of the other end of the both ends which engages with the each of the plurality of protuberances of the one end of the both ends.

9. The method for producing a polyimide film according to claim 6, wherein the polyimide compound in the step of exposing to normal temperature and humidity is kept in an environment of a temperature of about 22° C. and a humidity of about 55%.

* * * * *